US011915709B2

(12) United States Patent
Zhang et al.

(10) Patent No.: US 11,915,709 B2
(45) Date of Patent: *Feb. 27, 2024

(54) INTER-CHANNEL PHASE DIFFERENCE PARAMETER EXTRACTION METHOD AND APPARATUS

(71) Applicant: Huawei Technologies Co., Ltd., Shenzhen (CN)

(72) Inventors: Xingtao Zhang, Shenzhen (CN); Haiting Li, Beijing (CN); Zexin Liu, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,284

(22) Filed: Jun. 16, 2022

(65) Prior Publication Data

US 2022/0328053 A1 Oct. 13, 2022

Related U.S. Application Data

(63) Continuation of application No. 16/201,681, filed on Nov. 27, 2018, now Pat. No. 11,393,480, which is a (Continued)

(30) Foreign Application Priority Data

May 31, 2016 (CN) ......................... 201610377800.4
Oct. 14, 2016 (WO) ................ PCT/CN2016/102128

(51) Int. Cl.
*G10L 19/008* (2013.01)
*G10L 19/022* (2013.01)
(Continued)

(52) U.S. Cl.
CPC .................................. *G10L 19/008* (2013.01)

(58) Field of Classification Search
CPC ..... G10L 19/008; G10L 19/022; G10L 19/22; G10L 19/18; G10L 25/18; G10L 19/02;
(Continued)

(56) References Cited

U.S. PATENT DOCUMENTS

2006/0004583 A1* 1/2006 Herre .................... G10L 19/008 704/500
2008/0002842 A1* 1/2008 Neusinger ............... G10L 19/26 381/119
(Continued)

FOREIGN PATENT DOCUMENTS

CN 101410889 A 4/2009
CN 102165519 A 8/2011
(Continued)

OTHER PUBLICATIONS

Virette, D., et al. "G.722 annex D and G.711.1 Annex F—New ITU-T stereo codecs," XP032508530, ICASSP, 2013, pp. 528-532.
(Continued)

*Primary Examiner* — Richemond Dorvil
*Assistant Examiner* — Rodrigo A Chavez
(74) *Attorney, Agent, or Firm* — Conley Rose, P.C.

(57) ABSTRACT

An inter-channel phase difference (IPD) parameter extraction method includes obtaining a parameter for obtaining an information extraction manner for a current frame of a multi-channel signal; obtaining an IPD parameter extraction manner for the current frame based on the parameter for obtaining the information extraction manner, where the obtained IPD parameter extraction manner is one of at least two preset IPD parameter extraction manners; and obtaining an IPD parameter of the current frame based on the obtained IPD parameter extraction manner for the current frame.

20 Claims, 6 Drawing Sheets

Related U.S. Application Data continuation of application No. PCT/CN2017/085909, filed on May 25, 2017.

(51) Int. Cl.

*G10L 19/18* (2013.01)
*G10L 19/02* (2013.01)
*G10L 19/00* (2013.01)
*G10L 25/18* (2013.01)

(58) Field of Classification Search

CPC ....... G10L 19/167; G10L 19/00; G10L 19/04; G10L 19/0204; G10L 21/04; G10L 25/06; G10L 2019/0012

USPC .......................................................... 704/500

See application file for complete search history.

(56) References Cited

U.S. PATENT DOCUMENTS

| | | | | |
|---|---|---|---|---|
| 2009/0222272 | A1 | 9/2009 | Seefeldt et al. | |
| 2010/0079185 | A1 | 4/2010 | Lee et al. | |
| 2010/0241436 | A1* | 9/2010 | Kim | G10L 19/008 704/E21.001 |
| 2011/0123031 | A1* | 5/2011 | Ojala | G10L 19/008 381/17 |
| 2011/0173005 | A1* | 7/2011 | Hilpert | G10L 19/008 704/500 |
| 2011/0257968 | A1 | 10/2011 | Kim et al. | |
| 2012/0207311 | A1* | 8/2012 | Hoang | G10L 19/008 381/23 |
| 2013/0230176 | A1 | 9/2013 | Virette et al. | |
| 2014/0164001 | A1 | 6/2014 | Lang et al. | |
| 2014/0211947 | A1 | 7/2014 | Wu et al. | |
| 2015/0036849 | A1 | 2/2015 | Thompson | |
| 2015/0049872 | A1 | 2/2015 | Virette et al. | |
| 2016/0254002 | A1 | 9/2016 | Zhang et al. | |
| 2017/0365260 | A1* | 12/2017 | Chebiyyam | G10L 19/167 |
| 2019/0096411 | A1 | 3/2019 | Zhang et al. | |
| 2022/0328053 | A1* | 10/2022 | Zhang | G10L 19/008 |

FOREIGN PATENT DOCUMENTS

| | | | |
|---|---|---|---|
| CN | 102446507 | A | 5/2012 |
| CN | 102844808 | A | 12/2012 |
| CN | 103262159 | A | 8/2013 |
| CN | 103534753 | A | 1/2014 |
| CN | 104053120 | A | 9/2014 |
| CN | 104205211 | A | 12/2014 |
| CN | 104681029 | A | 6/2015 |
| EP | 2296142 | A2 | 3/2011 |
| KR | 101033241 | B1 | 5/2011 |
| KR | 102196390 | B1 | 12/2020 |
| WO | 2010037427 | A1 | 4/2010 |
| WO | 2012058805 | A1 | 5/2012 |

OTHER PUBLICATIONS

"Information technology—High efficiency coding and media delivery in heterogeneous environments—Part 3: 3D audio," ISO/IEC JTC 1/SC 29/WG 11, ISO/IEC JTC 1/SC 29 N, ISO/IEC CD 23008-3, Apr. 2014, 337 pages.

"Series G: Transmission Systems and Media, Digital Systems, Digital terminal equipments—Coding of voice and audio signals, 7 kHz audio-coding within 64 kbit/s, Amendment 2: New Appendix V extending Annex B superwideband for mid-side stereo," ITU-T G.722, Mar. 2011, 10 pages.

ETSI TS 103 190-2 V1.1.1, "Digital Audio Compression (AC-4) Standard Part 2: Immersive and personalized audio," Sep. 2015, 205 pages.

ETSI TS 103 190 V1.1.1, "Digital Audio Compression (AC-4) Standard," Apr. 2014, 295 pages.

* cited by examiner

INTER-CHANNEL PHASE DIFFERENCE PARAMETER EXTRACTION METHOD AND APPARATUS

CROSS-REFERENCE TO RELATED APPLICATIONS

This is a continuation of U.S. patent application Ser. No. 16/201,681 filed on Nov. 27, 2018, which is a continuation of International Patent Application No. PCT/CN2017/085909 filed on May 25, 2017, which claims priority to International Patent Application No. PCT/CN2016/102128 filed on Oct. 14, 2016 and Chinese Patent Application No. 201610377800.4 filed on May 31, 2016. All of the aforementioned patent applications are hereby incorporated by reference in their entireties.

TECHNICAL FIELD

The present disclosure relates to the field of communications technologies, and in particular, to an inter-channel phase difference (IPD) parameter extraction method and apparatus.

BACKGROUND

With improvement of quality of life, people are having increasing demands for high-quality audio. Compared with mono audio, stereo audio conveys a sense of orientation and distribution of sound sources, and can make audio information clearer and better understood and improve a sense of presence during audio play. Therefore, stereo audio is highly favored by people.

Parametric stereo (PS) coding is one of common coding schemes for stereo processing technologies. PS coding means that encoding and decoding processing is performed on a stereo signal (that is, a multi-channel signal) based on a spatial perception feature such that coding and decoding of the multi-channel signal is converted into encoding and decoding of mono audio signals and encoding and decoding of a spatial perception parameter. Spatial perception parameters in PS coding include an inter-channel coherence (IC), an inter-channel level difference (ILD), an inter-channel time difference (ITD), an IPD, and the like. The ITD and the IPD are spatial perception parameters that represent a horizontal orientation of a sound source. The ILD, the ITD, and the IPD decide how the human ear percepts a location of a sound source, which can effectively determine a sound field location and are significant for stereo signal restoration. Therefore, determining parameters such as the IPD is significant for stereo signal restoration.

In some other approaches, for an IPD parameter of each frame of a stereo signal, a time-domain signal is converted into a frequency-domain signal, the frequency-domain signal is divided into a plurality of subbands, an IPD parameter is calculated for each subband, and the IPD parameter of each subband is used for stereo signal coding after being quantized and encoded. Hence, for a frequency-domain signal on a plurality of subbands, an IPD parameter needs to be calculated for each subband, occupying a large quantity of resources and causing a low coding rate.

In some other approaches, for an IPD parameter of each frame of a stereo signal, a time-domain signal is converted into a frequency-domain signal, then an IPD parameter of one frame is calculated based on the frequency-domain signal, where the IPD parameter of one frame is referred to as a Group IPD parameter, and finally, the group IPD parameter is used for stereo signal coding after being quantized and encoded. In these approaches, only one IPD parameter (the Group IPD parameter) is extracted, and therefore only the one IPD parameter can be quantized and encoded. Although a small quantity of resources are occupied, accuracy of extracted phase information is low and coding quality is poor.

SUMMARY

This application provides an IPD parameter extraction method and apparatus, to enrich choices of an IPD parameter extraction manner, better maintain phase information, and improve audio coding quality.

According to a first aspect, an IPD parameter extraction method is provided, where the method may include obtaining a parameter used to determine an information extraction manner for a current frame of a multi-channel signal, determining an IPD parameter extraction manner for the current frame of multi-channel signal based on the parameter used to determine the information extraction manner for the current frame of the multi-channel signal, where the determined IPD parameter extraction manner for the current frame of multi-channel signal is one of at least two preset IPD parameter extraction manners, and extracting an IPD parameter of the current frame of multi-channel signal based on the determined IPD parameter extraction manner for the current frame of multi-channel signal.

According to the method provided in this application, a plurality of IPD parameter extraction manners may be preset such that in determining the IPD parameter extraction manner for the current frame of multi-channel signal, the IPD parameter extraction manner for the current frame of multi-channel signal may be determined based on the obtained parameter used to determine the information extraction manner for the current frame of the multi-channel signal, and then the IPD parameter of the current frame of multi-channel signal may be extracted based on the determined IPD parameter extraction manner. In this application, choices of the IPD parameter extraction manner for the current frame of multi-channel signal are enriched, and the IPD parameter extraction manner for the current frame of multi-channel signal correlates with the parameter used to determine the information extraction manner for the current frame more closely such that phase information can be better maintained, and multi-channel signal coding quality can be improved.

With reference to the first aspect, in a first possible implementation, the parameter used to determine the information extraction manner for the current frame of the multi-channel signal includes at least one of a signal feature parameter of the current frame and a signal feature parameter of each of A frames previous to the current frame, where A is an integer not less than 1, the signal feature parameter of the current frame includes at least one of a left-right channel coherence value of the current frame, a parameter that is of the current frame and that represents a left-right channel coherence, a subband IPD variance of the current frame, a signal class of the current frame, and an ITD of the current frame, the signal feature parameter of each of the A frames previous to the current frame includes at least one of a left-right channel coherence value of each of the A frames previous to the current frame, a parameter that is of each of the A frames previous to the current frame and that represents a left-right channel coherence, a subband IPD variance of each of the A frames previous to the current frame, an ITD of each of the A frames previous to the current frame, an IPD parameter extraction manner for each of the A frames previous to the current frame, and a signal class of each of the A frames previous to the current frame, and the signal class includes speech frame or music frame.

The parameter, provided in this application, used to determine the information extraction manner for the current frame of the multi-channel signal includes the signal feature parameter of the current frame, or the signal feature parameter of each of the A frames previous to the current frame, or the signal feature parameter of the current frame and the signal feature parameter of each of the A frames previous to the current frame, or the like. The signal feature parameter of the current frame and the signal feature parameter of each of the A frames previous to the current frame each may include one or more parameters such that the IPD parameter extraction manner for the current frame of multi-channel signal correlates with the signal feature parameter of the current frame or the signal feature parameter of each of the A frames previous to the current frame more closely, and applicability of the IPD parameter extraction manner for the current frame of multi-channel signal is improved.

With reference to the first possible implementation of the first aspect, in a second possible implementation, the parameter used to determine the information extraction manner for the current frame of the multi-channel signal includes the left-right channel coherence value of the current frame and the subband IPD variance of the current frame, and if the left-right channel coherence value of the current frame is greater than a first threshold, and the subband IPD variance of the current frame is less than a second threshold, determining an IPD parameter extraction manner for the current frame of multi-channel signal based on the parameter used to determine the information extraction manner for the current frame of the multi-channel signal includes determining that the IPD parameter extraction manner for the current frame of multi-channel signal is a first extraction manner.

According to the method provided in this application, when the left-right channel coherence value of the current frame meets a condition, and the subband IPD variance of the current frame also meets a condition, it may be determined that the IPD parameter extraction manner for the current frame of multi-channel signal is the first extraction manner such that the first extraction manner correlates with both the left-right channel coherence value of the current frame and the subband IPD variance of the current frame of multi-channel signal more closely, and applicability of the IPD parameter extraction manner for the current frame of multi-channel signal is improved.

With reference to the first possible implementation of the first aspect, in a third possible implementation, the parameter used to determine the information extraction manner for the current frame of the multi-channel signal includes the parameter that is of the current frame and that represents left-right channel coherence and the subband IPD variance of the current frame, and if a value of the parameter that is of the current frame and that represents left-right channel coherence is greater than a first threshold, and the subband IPD variance of the current frame is less than a second threshold, determining an IPD parameter extraction manner for the current frame of multi-channel signal based on the parameter used to determine the information extraction manner for the current frame of the multi-channel signal includes determining that the IPD parameter extraction manner for the current frame of multi-channel signal is a first extraction manner.

According to the method provided in this application, when the parameter that is of the current frame and that represents left-right channel coherence meets a condition, it may be determined that the IPD parameter extraction manner for the current frame of multi-channel signal is the first extraction manner such that applicability of the IPD parameter extraction manner for the current frame of multi-channel signal is improved.

With reference to the second possible implementation of the first aspect, in a fourth possible implementation, the first threshold is 0.75.

With reference to the first possible implementation of the first aspect, in a fifth possible implementation, the parameter used to determine the information extraction manner for the current frame of the multi-channel signal includes the IPD parameter extraction manner for each of the A frames previous to the current frame and the signal class of each of the A frames previous to the current frame, and if the IPD parameter extraction manner for each of the A frames previous to the current frame is a first extraction manner, and the signal class of each of the A frames previous to the current frame is music frame, determining an IPD parameter extraction manner for the current frame of multi-channel signal based on the parameter used to determine the information extraction manner for the current frame of the multi-channel signal includes determining that the IPD parameter extraction manner for the current frame of multi-channel signal is the first extraction manner.

According to the method provided in this application, when the IPD parameter extraction manner for each of the A frames previous to the current frame meets a requirement, and the signal class of each of the A frames previous to the current frame meets a requirement, it may be determined that the IPD parameter extraction manner for the current frame of multi-channel signal is the first extraction manner such that the first extraction manner correlates with the signal feature parameter of each of the A frames previous to the current frame more closely, and selection accuracy of the IPD parameter extraction manner for the current frame of multi-channel signal can be improved.

With reference to the first possible implementation of the first aspect, in a sixth possible implementation, the parameter used to determine the information extraction manner for the current frame of the multi-channel signal includes the ITD of the current frame, the subband IPD variance of the current frame, and the signal class of each of the A frames previous to the current frame, and if a value of the ITD of the current frame is greater than a third threshold, the subband IPD variance of the current frame is less than a fourth threshold, and the signal class of each of the A frames previous to the current frame is speech frame, determining an IPD parameter extraction manner for the current frame of multi-channel signal based on the parameter used to determine the information extraction manner for the current frame of the multi-channel signal includes determining that the IPD parameter extraction manner for the current frame of multi-channel signal is a first extraction manner.

According to the method provided in this application, when signal feature parameters such as the ITD parameter and the subband IPD variance of the current frame meet conditions, and the signal class of each of the A frames previous to the current frame meets a requirement, it may be determined that the IPD parameter extraction manner for the current frame of multi-channel signal is the first extraction manner such that the first extraction manner correlates with both the signal feature parameter of the current frame and the signal feature parameter of each of the A frames previous to the current frame more closely, and applicability of the IPD parameter extraction manner for the current frame of multi-channel signal can be improved.

With reference to any one of the second possible implementation of the first aspect to the sixth possible implementation of the first aspect, in a seventh possible implementation, the first extraction manner includes extracting a group IPD parameter of the current frame of multi-channel signal, or extracting no IPD parameter of the current frame of multi-channel signal, or setting the IPD parameter of the current frame of multi-channel signal to 0.

In this application, three optional implementations are provided as the first extraction manner such that choices of the IPD parameter extraction manner for the current frame of multi-channel signal are enriched, and applicability of the IPD parameter extraction manner for the current frame of multi-channel signal is improved.

With reference to the seventh possible implementation of the first aspect, in an eighth possible implementation, when the first extraction manner is extracting a group IPD parameter of the current frame of multi-channel signal, extracting an IPD parameter of the current frame of multi-channel signal based on the determined IPD parameter extraction manner for the current frame of multi-channel signal includes extracting subband IPD parameters of left- and right-channel frequency-domain signals of the current frame, and determining a group IPD of the current frame of multi-channel signal based on the extracted subband IPD parameters.

According to the method provided in this application, when the IPD parameter extraction manner for the current frame of multi-channel signal is extracting a group IPD, the subband IPD parameters of the left- and right-channel frequency-domain signals of the current frame may be extracted, and the group IPD of the current frame of multi-channel signal may be determined based on the extracted subband IPD parameters such that the group IPD of the current frame of multi-channel signal correlates with the subband IPD parameters of the left- and right-channel frequency-domain signals of the current frame, and IPD parameter coding quality can be improved. When the IPD parameter extraction manner for the current frame of multi-channel signal is extracting a group IPD, IPD parameter coding occupies a relatively small quantity of bits, and more bits can be used for coding of other parameters, thereby improving audio coding quality.

With reference to any one of the second possible implementation of the first aspect to the sixth possible implementation of the first aspect, in a ninth possible implementation, if the IPD parameter extraction manner for the current frame of multi-channel signal is not the first extraction manner, determining an IPD parameter extraction manner for the current frame of multi-channel signal based on the parameter used to determine the information extraction manner for the current frame of the multi-channel signal further includes determining that the IPD parameter extraction manner for the current frame of multi-channel signal is a second extraction manner, where the second extraction manner includes extracting subband set IPD parameters or extracting subband IPD parameters.

With reference to the ninth possible implementation of the first aspect, in a tenth possible implementation, the second extraction manner is extracting subband set IPD parameters, and determining that the IPD parameter extraction manner for the current frame of multi-channel signal is a second extraction manner includes classifying subbands of left- and right-channel frequency-domain signals of the current frame of multi-channel signal into at least two subband sets, where each subband set includes at least one subband, and at least one subband set includes at least two subbands, obtaining a subband IPD variance of each subband set, and if the subband IPD variance of each subband set is less than the second threshold, and the left-right channel coherence value of the current frame is greater than the first threshold, determining that the IPD parameter extraction manner for the current frame of multi-channel signal is extracting subband set IPD parameters, and extracting an IPD parameter of the current frame of multi-channel signal based on the determined IPD parameter extraction manner for the current frame of multi-channel signal includes calculating an IPD parameter of each of the at least two subband sets.

According to the method provided in this application, when the IPD parameter extraction manner of the current frame of multi-channel signal is not the first extraction manner, the IPD parameter extraction manner for the current frame of multi-channel signal may be further determined based on subband IPDs of a plurality of subband sets obtained by classifying the subbands of the left- and right-channel frequency-domain signals of the current frame. When the subband IPD variance of each subset set obtained through classification meets a condition, and the left-right channel coherence value of the current frame also meets a condition, the IPD parameter extraction manner for the current frame of multi-channel signal is extracting subband set IPD parameters, and then the IPD parameter of each subband set may be calculated such that the IPD parameter of each subband set can be determined as the IPD parameter of the current frame of multi-channel signal. In this application, choices of the IPD parameter extraction manner for the current frame of multi-channel signal can be enriched. A plurality of IPD parameters are used as the IPD parameter of the current frame of multi-channel signal such that phase information can be better maintained, and audio coding accuracy can be improved. In addition, a quantity of IPD parameters extracted after subbands are classified into subband sets is less than that of IPD parameters extracted for all subbands, and more bits can be used for coding of other parameters, thereby improving audio coding quality.

With reference to the ninth possible implementation of the first aspect, in an eleventh possible implementation, the second extraction manner is extracting subband set IPD parameters, and determining that the IPD parameter extraction manner for the current frame of multi-channel signal is a second extraction manner includes classifying subbands of left- and right-channel frequency-domain signals of the current frame of multi-channel signal into at least two subband sets, where each subband set includes at least one subband, and at least one subband set includes at least two subbands, and calculating an IPD parameter of each of the at least two subband sets.

With reference to the ninth possible implementation of the first aspect, in a twelfth possible implementation, the second extraction manner is extracting subband IPD parameters, and determining that the IPD parameter extraction manner for the current frame of multi-channel signal is a second extraction manner includes, if a subband IPD variance of at least one subband set is greater than the second threshold, or the left-right channel coherence value of the current frame is less than or equal to the first threshold, determining that the IPD parameter extraction manner for the current frame of multi-channel signal is extracting subband IPD parameters, and extracting an IPD parameter of the current frame of multi-channel signal based on the determined IPD parameter extraction manner for the current frame of multi-channel signal includes calculating IPD parameters of all or some subbands of left- and right-channel frequency-domain signals of the current frame.

According to the method provided in this application, when the IPD parameter extraction manner of the current frame of multi-channel signal is not the first extraction manner, it may be determined that the IPD parameter extraction manner for the current frame of multi-channel signal is extracting subband IPD parameters, and then the IPD parameters of the all or some subbands of the left- and right-channel frequency-domain signals of the current frame may be calculated such that the IPD parameter of the all or some subbands can be determined as the IPD parameter of the current frame of multi-channel signal. In this application, choices of the IPD parameter extraction manner for the current frame of multi-channel signal can be enriched. The IPD parameters of the all or some subbands of the left- and right-channel frequency-domain signals of the current frame are used as the IPD parameter of the current frame of multi-channel signal such that phase information can be better maintained, and audio coding accuracy can be improved.

With reference to the ninth possible implementation of the first aspect, in a thirteenth possible implementation, the second extraction manner is extracting subband IPD parameters, and determining that the IPD parameter extraction manner for the current frame of multi-channel signal is a second extraction manner includes calculating IPD parameters of all or some subbands of left- and right-channel frequency-domain signals of the current frame.

With reference to the first possible implementation of the first aspect, in a fourteenth possible implementation, when the parameter used to determine the information extraction manner for the current frame of the multi-channel signal includes the left-right channel coherence value of the current frame, obtaining a parameter used to determine an information extraction manner for a current frame of a multi-channel signal includes obtaining left- and right-channel time-domain signals of the current frame of the multi-channel signal, and converting the left- and right-channel time-domain signals into left- and right-channel frequency-domain signals, and calculating the left-right channel coherence value of the current frame of multi-channel signal based on the left- and right-channel frequency-domain signals.

According to the method provided in this application, the left- and right-channel time-domain signals of the current frame of the multi-channel signal may be converted into the left- and right-channel frequency-domain signals, and the left-right channel coherence value of the current frame may be calculated based on the left- and right-channel frequency-domain signals, to determine the IPD parameter extraction manner for the current frame of multi-channel signal such that determining of the IPD parameter extraction manner for the current frame of multi-channel signal can correlate with the left- and right-channel frequency-domain signals of the current frame more closely, and accuracy of determining the IPD parameter extraction manner can be improved.

With reference to the first possible implementation of the first aspect, in a fifteenth possible implementation, when the parameter used to determine the information extraction manner for the current frame of the multi-channel signal includes the subband IPD variance of the current frame, obtaining a parameter used to determine an information extraction manner for a current frame of a multi-channel signal includes obtaining left- and right-channel time-domain signals of the current frame of the multi-channel signal, and converting the left- and right-channel time-domain signals into left- and right-channel frequency-domain signals, and dividing the left- and right-channel frequency-domain signals into at least two subbands, calculating an IPD of each subband based on a frequency-domain signal of each subband, and calculating the subband IPD variance of the current frame based on the IPD of each subband.

According to the method provided in this application, the left- and right-channel time-domain signals of the current frame of the multi-channel signal may be converted into the left- and right-channel frequency-domain signals, and the IPD of each subband of the current frame may be calculated based on the left- and right-channel frequency-domain signals to calculate the subband IPD variance of the current frame and then determine the IPD parameter extraction manner for the current frame of multi-channel signal such that determining of the IPD parameter extraction manner for the current frame of multi-channel signal can correlate with the left- and right-channel frequency-domain signals of the current frame more closely, and accuracy of determining the IPD parameter extraction manner can be improved.

According to a second aspect, an IPD parameter extraction apparatus is provided, where the extraction apparatus may include an obtaining module configured to obtain a parameter used to determine an information extraction manner for a current frame of a multi-channel signal, a determining module configured to determine an IPD parameter extraction manner for the current frame of multi-channel signal based on the parameter that is obtained by the obtaining module and that is used to determine the information extraction manner for the current frame of the multi-channel signal, where the determined IPD parameter extraction manner for the current frame of multi-channel signal is one of at least two preset IPD parameter extraction manners, and an extraction module configured to extract an IPD parameter of the current frame of multi-channel signal based on the IPD parameter extraction manner that is for the current frame of multi-channel signal and that is determined by the determining module.

According to the extraction apparatus provided in this application, a plurality of IPD parameter extraction manners may be preset such that in determining the IPD parameter extraction manner for the current frame of multi-channel signal, the IPD parameter extraction manner for the current frame of multi-channel signal may be determined based on the obtained parameter used to determine the information extraction manner for the current frame of the multi-channel signal, and then the IPD parameter of the current frame of multi-channel signal may be extracted based on the determined IPD parameter extraction manner. In this application, choices of the IPD parameter extraction manner for the current frame of multi-channel signal are enriched, and the IPD parameter extraction manner for the current frame of multi-channel signal correlates with the parameter used to determine the information extraction manner for the current frame more closely such that phase information can be better maintained, and multi-channel signal coding quality can be improved.

With reference to the second aspect, in a first possible implementation, the parameter used to determine the information extraction manner for the current frame of the multi-channel signal includes at least one of a signal feature parameter of the current frame and a signal feature parameter of each of A frames previous to the current frame, where A is an integer not less than 1, the signal feature parameter of the current frame includes at least one of a left-right channel coherence value of the current frame, a parameter that is of the current frame and that represents a left-right channel coherence, a subband IPD variance of the current frame, a signal class of the current frame, and an ITD of the current frame, the signal feature parameter of each of the A frames previous to the current frame includes at least one of a left-right channel coherence value of each of the A frames previous to the current frame, a parameter that is of each of the A frames previous to the current frame and that represents a left-right channel coherence, a subband IPD variance of each of the A frames previous to the current frame, an ITD of each of the A frames previous to the current frame, an IPD parameter extraction manner for each of the A frames previous to the current frame, and a signal class of each of the A frames previous to the current frame, and the signal class includes speech frame or music frame.

With reference to the first possible implementation of the second aspect, in a second possible implementation, the parameter used to determine the information extraction manner for the current frame of the multi-channel signal includes the left-right channel coherence value of the current frame and the subband IPD variance of the current frame, and if the left-right channel coherence value of the current frame is greater than a first threshold, and the subband IPD variance of the current frame is less than a second threshold, the determining module is further configured to determine that the IPD parameter extraction manner for the current frame of multi-channel signal is a first extraction manner.

With reference to the first possible implementation of the second aspect, in a third possible implementation, the parameter used to determine the information extraction manner for the current frame of the multi-channel signal includes the parameter that is of the current frame and that represents left-right channel coherence, and if a value of the parameter that is of the current frame and that represents left-right channel coherence is greater than a first threshold, the determining module is further configured to determine that the IPD parameter extraction manner for the current frame of multi-channel signal is a first extraction manner.

With reference to the third possible implementation of the second aspect, in a fourth possible implementation, the first threshold is 0.75.

With reference to the first possible implementation of the second aspect, in a fifth possible implementation, the parameter used to determine the information extraction manner for the current frame of the multi-channel signal includes the IPD parameter extraction manner for each of the A frames previous to the current frame and the signal class of each of the A frames previous to the current frame, and if the IPD parameter extraction manner for each of the A frames previous to the current frame is a first extraction manner, and the signal class of each of the A frames previous to the current frame is music frame, the determining module is further configured to determine that the IPD parameter extraction manner for the current frame of multi-channel signal is the first extraction manner.

With reference to the first possible implementation of the second aspect, in a sixth possible implementation, the parameter used to determine the information extraction manner for the current frame of the multi-channel signal includes the ITD of the current frame, the subband IPD variance of the current frame, and the signal class of each of the A frames previous to the current frame, and if a value of the ITD of the current frame is greater than a third threshold, the subband IPD variance of the current frame is less than a fourth threshold, and the signal class of each of the A frames previous to the current frame is speech frame, the determining module is further configured to determine that the IPD parameter extraction manner for the current frame of multi-channel signal is a first extraction manner.

With reference to any one of the second possible implementation of the second aspect to the sixth possible implementation of the second aspect, in a seventh possible implementation, the first extraction manner includes extracting a group IPD parameter of the current frame of multi-channel signal, or extracting no IPD parameter of the current frame of multi-channel signal, or setting the IPD parameter of the current frame of multi-channel signal to 0.

With reference to the seventh possible implementation of the second aspect, in an eighth possible implementation, when the determining module determines that the IPD parameter extraction manner for the current frame of multi-channel signal is extracting a group IPD, the extraction module is further configured to extract subband IPD parameters of left- and right-channel frequency-domain signals of the current frame, and determine a group IPD of the current frame of multi-channel signal based on the extracted subband IPD parameters.

With reference to any one of the second possible implementation of the second aspect to the fifth possible implementation of the second aspect, in a ninth possible implementation, if the IPD parameter extraction manner for the current frame of multi-channel signal is not the first extraction manner, the determining module is further configured to determine that the IPD parameter extraction manner for the current frame of multi-channel signal is a second extraction manner, where the second extraction manner includes extracting subband set IPD parameters or extracting subband IPD parameters.

With reference to the ninth possible implementation of the second aspect, in a tenth possible implementation, the second extraction manner is extracting subband set IPD parameters, and the determining module is further configured to classify subbands of left- and right-channel frequency-domain signals of the current frame of multi-channel signal into at least two subband sets, where each subband set includes at least one subband, and at least one subband set includes at least two subbands, obtain a subband IPD variance of each subband set, and if the subband IPD variance of each subband set is less than the second threshold, and the left-right channel coherence value of the current frame is greater than the first threshold, determine that the IPD parameter extraction manner for the current frame of multi-channel signal is extracting subband set IPD parameters, and the extraction module is further configured to calculate an IPD parameter of each of the at least two subband sets determined by the determining module.

With reference to the ninth possible implementation of the second aspect, in an eleventh possible implementation, the second extraction manner is extracting subband set IPD parameters, and the determining module is further configured to classify subbands of left- and right-channel frequency-domain signals of the current frame of multi-channel signal into at least two subband sets, where each subband set includes at least one subband, and at least one subband set includes at least two subbands, and the extraction module is further configured to calculate an IPD parameter of each of the at least two subband sets determined by the determining module.

With reference to the ninth possible implementation of the second aspect, in a twelfth possible implementation, the second extraction manner is extracting subband IPD parameters, and the determining module is further configured to, if a subband IPD variance of at least one subband set is greater than the second threshold, or the left-right channel coherence value of the current frame is less than or equal to the first threshold, determine that the IPD parameter extraction manner for the current frame of multi-channel signal is extracting subband IPD parameters, and the extraction module is further configured to calculate IPD parameters of all subbands of left- and right-channel frequency-domain signals of the current frame.

With reference to the ninth possible implementation of the second aspect, in a thirteenth possible implementation, the second extraction manner is extracting subband IPD parameters, and the extraction module is further configured to calculate IPD parameters of all subbands of left- and right-channel frequency-domain signals of the current frame.

With reference to the first possible implementation of the second aspect, in a fourteenth possible implementation, when the parameter used to determine the information extraction manner for the current frame of the multi-channel signal includes the left-right channel coherence value of the current frame, the obtaining module is further configured to obtain left- and right-channel time-domain signals of the current frame of the multi-channel signal, and convert the left- and right-channel time-domain signals into left- and right-channel frequency-domain signals, and calculate the left-right channel coherence value of the current frame based on the left- and right-channel frequency-domain signals.

With reference to the first possible implementation of the second aspect, in a fifteenth possible implementation, when the parameter used to determine the information extraction manner for the current frame of the multi-channel signal includes the subband IPD variance of the current frame, the obtaining module is further configured to obtain left- and right-channel time-domain signals of the current frame of the multi-channel signal, and convert the left- and right-channel time-domain signals into left- and right-channel frequency-domain signals, and divide the left- and right-channel frequency-domain signals into at least two subbands, calculate an IPD of each subband based on a frequency-domain signal of each subband, and calculate the subband IPD variance of the current frame based on the IPD of each subband.

In this application, when the IPD parameter extraction manner for the current frame of multi-channel signal is extracting a group IPD, IPD parameter coding occupies a relatively small quantity of bits, and more bits can be used for coding of other parameters, thereby improving audio coding quality. In this application, a plurality of IPD parameters may be used as the IPD parameter of the current frame of multi-channel signal such that phase information can be better maintained, and audio coding accuracy can be improved. In addition, a quantity of IPD parameters extracted after subbands are classified into subband sets is less than that of IPD parameters extracted for all subbands, and more bits can be used for coding of other parameters, thereby improving audio coding quality.

According to a third aspect, a terminal is provided, including a memory and a processor, where the memory is connected to the processor, the memory is configured to store a set of program code, and the processor is configured to call the program code stored in the memory to perform the following operations of obtaining a parameter used to determine an information extraction manner for a current frame of a multi-channel signal, determining an IPD parameter extraction manner for the current frame of multi-channel signal based on the parameter used to determine the information extraction manner for the current frame of the multi-channel signal, where the determined IPD parameter extraction manner for the current frame of multi-channel signal is one of at least two preset IPD parameter extraction manners, and extracting an IPD parameter of the current frame of multi-channel signal based on the determined IPD parameter extraction manner for the current frame of multi-channel signal.

According to the terminal provided in this application, a plurality of IPD parameter extraction manners may be preset such that in determining the IPD parameter extraction manner for the current frame of multi-channel signal, the IPD parameter extraction manner for the current frame of multi-channel signal may be determined based on the obtained parameter used to determine the information extraction manner for the current frame of the multi-channel signal, and then the IPD parameter of the current frame of multi-channel signal may be extracted based on the determined IPD parameter extraction manner. In this application, choices of the IPD parameter extraction manner for the current frame of multi-channel signal are enriched, and the IPD parameter extraction manner for the current frame of multi-channel signal correlates with the parameter used to determine the information extraction manner for the current frame more closely such that phase information can be better maintained, and multi-channel signal coding quality can be improved.

With reference to the third aspect, in a first possible implementation, the parameter used to determine the information extraction manner for the current frame of the multi-channel signal includes at least one of a signal feature parameter of the current frame and a signal feature parameter of each of A frames previous to the current frame, where A is an integer not less than 1, the signal feature parameter of the current frame includes at least one of a left-right channel coherence value of the current frame, a subband IPD variance of the current frame, and an ITD of the current frame, the signal feature parameter of each of the A frames previous to the current frame includes at least one of a left-right channel coherence value of each of the A frames previous to the current frame, a subband IPD variance of each of the A frames previous to the current frame, an ITD of each of the A frames previous to the current frame, an IPD parameter extraction manner for each of the A frames previous to the current frame, and a signal class of each of the A frames previous to the current frame, and the signal class includes speech frame or music frame.

With reference to the first possible implementation of the third aspect, in a second possible implementation, the parameter used to determine the information extraction manner for the current frame of the multi-channel signal includes the left-right channel coherence value of the current frame and the subband IPD variance of the current frame, and if the left-right channel coherence value of the current frame is greater than a first threshold, and the subband IPD variance of the current frame is less than a second threshold, the processor is further configured to determine that the IPD parameter extraction manner for the current frame of multi-channel signal is a first extraction manner.

With reference to the first possible implementation of the third aspect, in a third possible implementation, the parameter used to determine the information extraction manner for the current frame of the multi-channel signal includes the IPD parameter extraction manner for each of the A frames previous to the current frame and the signal class of each of the A frames previous to the current frame, and if the IPD parameter extraction manner for each of the A frames previous to the current frame is a first extraction manner, and the signal class of each of the A frames previous to the current frame is music frame, the processor is further configured to determine that the IPD parameter extraction manner for the current frame of multi-channel signal is the first extraction manner.

With reference to the first possible implementation of the third aspect, in a fourth possible implementation, the parameter used to determine the information extraction manner for the current frame of the multi-channel signal includes the ITD of the current frame, the subband IPD variance of the current frame, and the signal class of each of the A frames previous to the current frame, and if a value of the ITD of the current frame is greater than a third threshold, the subband IPD variance of the current frame is less than a fourth threshold, and the signal class of each of the A frames previous to the current frame is speech frame, the processor is further configured to determine that the IPD parameter extraction manner for the current frame of multi-channel signal is a first extraction manner.

With reference to any one of the second possible implementation of the third aspect to the fourth possible implementation of the third aspect, in a fifth possible implementation, the first extraction manner includes extracting a group IPD parameter of the current frame of multi-channel signal, or extracting no IPD parameter of the current frame of multi-channel signal.

With reference to the fifth possible implementation of the third aspect, in a sixth possible implementation, when the first extraction manner is extracting a group IPD parameter of the current frame of multi-channel signal, the processor is further configured to extract subband IPD parameters of left- and right-channel frequency-domain signals of the current frame, and determine a group IPD of the current frame of multi-channel signal based on the extracted subband IPD parameters.

With reference to any one of the second possible implementation of the third aspect to the fourth possible implementation of the third aspect, in a seventh possible implementation, if the IPD parameter extraction manner for the current frame of multi-channel signal is not the first extraction manner, the processor is further configured to determine that the IPD parameter extraction manner for the current frame of multi-channel signal is a second extraction manner, where the second extraction manner includes extracting subband set IPD parameters or extracting subband IPD parameters.

With reference to the seventh possible implementation of the third aspect, in an eighth possible implementation, the second extraction manner is extracting subband set IPD parameters, and the processor is further configured to classify subbands of left- and right-channel frequency-domain signals of the current frame of multi-channel signal into at least two subband sets, where each subband set includes at least one subband, and at least one subband set includes at least two subbands, obtain a subband IPD variance of each subband set, if the subband IPD variance of each subband set is less than the second threshold, and the left-right channel coherence value of the current frame is greater than the first threshold, determine that the IPD parameter extraction manner for the current frame of multi-channel signal is extracting subband set IPD parameters, and calculate an IPD parameter of each of the at least two subband sets.

With reference to the eighth possible implementation of the third aspect, in a ninth possible implementation, the second extraction manner is extracting subband IPD parameters, and the processor is further configured to, if a subband IPD variance of at least one subband set is greater than the second threshold, or the left-right channel coherence value of the current frame is less than or equal to the first threshold, determine that the IPD parameter extraction manner for the current frame of multi-channel signal is extracting subband IPD parameters, and calculate IPD parameters of all subbands of left- and right-channel frequency-domain signals of the current frame.

With reference to the first possible implementation of the third aspect, in a tenth possible implementation, when the parameter used to determine the information extraction manner for the current frame of the multi-channel signal includes the left-right channel coherence value of the current frame, the processor is further configured to obtain left- and right-channel time-domain signals of the current frame of the multi-channel signal, and convert the left- and right-channel time-domain signals into left- and right-channel frequency-domain signals, and calculate the left-right channel coherence value of the current frame based on the left- and right-channel frequency-domain signals.

With reference to the first possible implementation of the third aspect, in an eleventh possible implementation, when the parameter used to determine the information extraction manner for the current frame of the multi-channel signal includes the subband IPD variance of the current frame, the processor is further configured to obtain left- and right-channel time-domain signals of the current frame of the multi-channel signal, and convert the left- and right-channel time-domain signals into left- and right-channel frequency-domain signals, and divide the left- and right-channel frequency-domain signals into at least two subbands, calculate an IPD of each subband based on a frequency-domain signal of each subband, and calculate the subband IPD variance of the current frame based on the IPD of each subband.

In this application, when the IPD parameter extraction manner for the current frame of multi-channel signal is extracting a group IPD, IPD parameter coding occupies a relatively small quantity of bits, and more bits can be used for coding of other parameters, thereby improving audio coding quality. In this application, a plurality of IPD parameters may be used as the IPD parameter of the current frame of multi-channel signal such that phase information can be better maintained, and audio coding accuracy can be improved. In addition, a quantity of IPD parameters extracted after subbands are classified into subband sets is less than that of IPD parameters extracted for all subbands, and more bits can be used for coding of other parameters, thereby improving audio coding quality.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
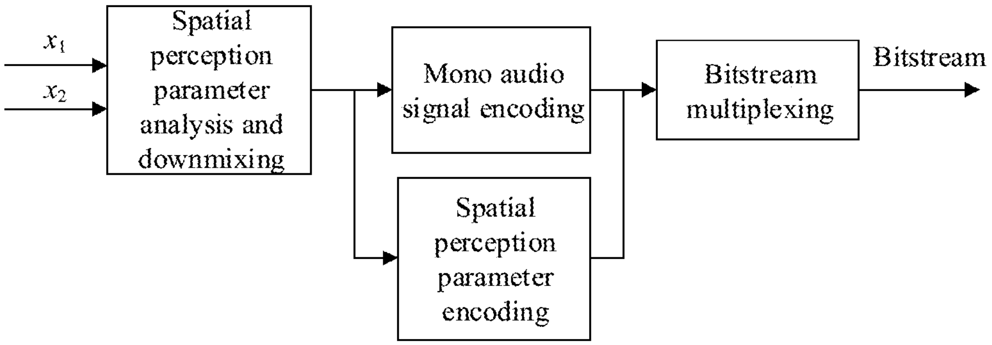
FIG. 1 is a schematic principle diagram of PS encoding.

Referring to FIG. 1, FIG. 1 is a schematic principle diagram of PS encoding.

In PS encoding, an encoder downmixes (downmix), into a mono audio signal, a stereo signal input by a plurality of channels (for example, an x1 channel and an x2 channel), extracts a spatial perception parameter of the stereo signal through spatial perception parameter analysis, then encodes the mono audio signal to obtain a mono audio bitstream, and encodes the spatial perception parameter to obtain a spatial perception parameter bitstream. Further, the encoder obtains a bitstream that the stereo signal is encoded into by multiplexing the mono audio bitstream and the spatial perception parameter bitstream.

Figure 2:
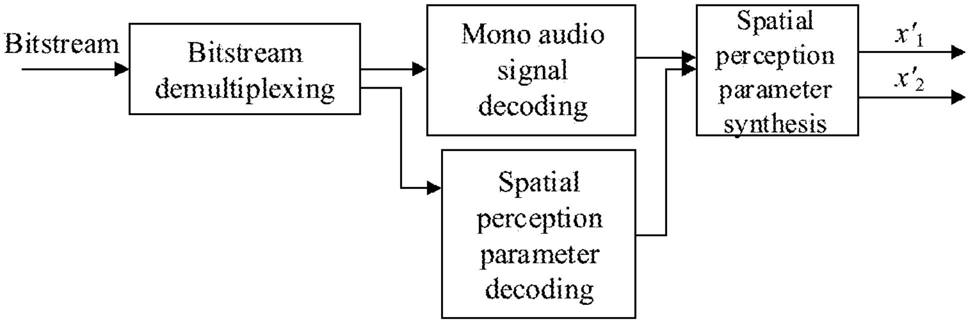
FIG. 2 is a schematic principle diagram of PS decoding.

Referring to FIG. 2, FIG. 2 is a schematic principle diagram of PS decoding.

A decoder demultiplexes a bitstream that a stereo signal is encoded into to obtain a mono audio bitstream and a spatial perception parameter bitstream, then performs mono audio signal decoding on the mono audio bitstream, and performs spatial perception parameter decoding on the spatial perception parameter bitstream. Further, the decoder decodes a mono audio signal and then synthesizes and reconstructs the stereo signal using a spatial perception parameter.

During specific implementation, spatial perception parameters in PS encoding and PS decoding include an IC, an ILD, an ITD, an IPD, and the like. The IC describes a coherence between channels. This parameter decides perception of a sound field range, and can improve a sense of space of an audio signal and acoustic stability. The ILD is used to identify a horizontal angle of a stereo source, and describes an intensity difference between channels. This parameter affects all frequency components of a spectrum. The ITD and the IPD are spatial perception parameters that represent a horizontal orientation of a sound source. The ILD, the ITD, and the IPD decide how the human ear percepts a location of a sound source, which can effectively determine a sound field location and are significant for stereo signal restoration. Therefore, determining parameters such as the IPD is significant for stereo signal restoration.

With reference to FIG. 3 to FIG. 8, the following describes in detail an IPD parameter extraction method and apparatus provided in the embodiments of the present disclosure.

Figure 3:
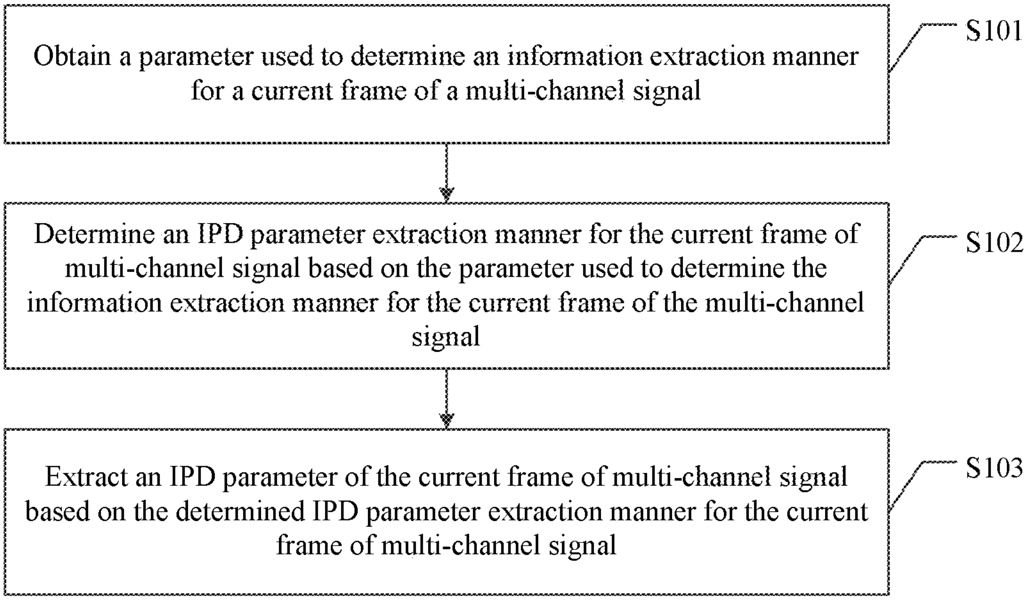
FIG. 3 is a schematic flowchart of an IPD parameter extraction method according to an embodiment of the present disclosure.

Referring to FIG. 3, FIG. 3 is a schematic flowchart of an IPD parameter extraction method according to an embodiment of the present disclosure. The method provided in this embodiment of the present disclosure includes the following steps.

Step S101. Obtain a parameter used to determine an information extraction manner for a current frame of a multi-channel signal.

During specific implementation, the IPD parameter extraction method provided in this embodiment of the present disclosure may be executed by an encoder for multi-channel signal coding. After extracting an IPD parameter of the current frame of multi-channel signal according to the IPD parameter extraction method provided in this embodiment of the present disclosure, the encoder may quantize and encode the extracted IPD parameter. After obtaining the IPD parameter through decoding, a decoder may use the IPD parameter obtained through decoding to perform stereo synthesis processing. The following describes in detail the IPD parameter extraction method provided in this embodiment of the present disclosure.

In some feasible implementations, when extracting the IPD parameter of the current frame of multi-channel signal, the encoder may first obtain the parameter that is used to determine the information extraction manner for the current frame of the multi-channel signal, and then may determine an IPD parameter extraction manner for the current frame of multi-channel signal based on the parameter used to determine the information extraction manner for the current frame. The parameter used to determine the information extraction manner for the current frame is used to determine a manner for extracting information such as the IPD parameter of the current frame of multi-channel signal. During specific implementation, the parameter used to determine the information extraction manner for the current frame of the multi-channel signal includes at least one of a signal feature parameter of the current frame and a signal feature parameter of each of A frames previous to the current frame. To be specific, the parameter used to determine the information extraction manner for the current frame of the multi-channel signal may include the signal feature parameter of the current frame, or the signal feature parameter of each of the A frames previous to the current frame, or the signal feature parameter of the current frame and the signal feature parameter of each of the A frames previous to the current frame, or the like. The parameter may be determined depending on actual application scenarios, and is not limited herein. A is an integer not less than 1. To be specific, the A frames previous to the current frame may be, for example, one frame, two frames, or three frames previous to the current frame. This is not limited herein.

During specific implementation, the signal feature parameter of the current frame may include one or more of parameters such as a left-right channel coherence value of the current frame, a parameter that is of the current frame and that represents a left-right channel coherence, a subband IPD variance of the current frame, a signal class of the current frame, and an ITD of the current frame. The left-right channel coherence value of the current frame, the parameter that is of the current frame and that represents left-right channel coherence, and the subband IPD variance of the current frame may be calculated based on left- and right-channel frequency-domain signals of the multi-channel signal. The ITD of the current frame may be determined by the encoder based on an ITD parameter extraction manner for the current frame of the multi-channel signal. The ITD parameter extraction manner for the current frame may include an extraction manner provided in a standard protocol, or an existing extraction manner known to a person skilled in the art. This is not limited herein.

The signal feature parameter of each of the A frames previous to the current frame includes at least one of a left-right channel coherence value of each of the A frames previous to the current frame, a parameter that is of each of the A frames previous to the current frame and that represents a left-right channel coherence, a subband IPD variance of each of the A frames previous to the current frame, an ITD of each of the A frames previous to the current frame, an IPD parameter extraction manner for each of the A frames previous to the current frame, and a signal class of each of the A frames previous to the current frame. To be specific, the signal feature parameter of each of the A frames previous to the current frame may include the IPD parameter extraction manner for each of the A frames previous to the current frame, or the signal class of each of the A frames previous to the current frame, or the IPD parameter extraction manner and the signal class of each of the A frames previous to the current frame, or the like. The signal feature parameter may be determined depending on actual application scenarios, and is not limited herein. The IPD parameter extraction manner for each of the A frames previous to the current frame may include an IPD parameter extraction manner that is for each of the A frames previous to the current frame of the multi-channel signal and that is determined by the encoder based on a parameter used to determine an information extraction manner for each of the A frames previous to the current frame of the multi-channel signal, or an IPD parameter extraction manner provided in the standard protocol, or an existing IPD parameter extraction manner known to a person skilled in the art, or the like. This is not limited herein. The signal class may include speech frame or music frame.

In some feasible implementations, the encoder may perform time-to-frequency conversion on left- and right-channel time-domain signals of the current frame of the multi-channel signal, to obtain left- and right-channel frequency-domain signals of the current frame. Further, the time-to-frequency conversion may be implemented through fast Fourier transformation (FFT) or modified discrete cosine transformation (MDCT), or in another manner. This is not limited herein. The time-to-frequency conversion may be performed on a per-frame basis, or may be performed on a per-subframe basis. For example, the encoder may convert the left- and right-channel time-domain signals of the current frame of the multi-channel signal into the left- and right-channel frequency-domain signals through FFT. Specific transformation formulas may include:

$$L(k)=\sum_{n=0}^{Length-1} x_L(n)\cdot e^{-j\frac{2\pi\cdot n\cdot k}{L}},\ 0\le k<L,$$

$$\text{and } R(k)=\sum_{n=0}^{Length-1} x_R(n)\cdot e^{-j\frac{2\pi\cdot n\cdot k}{L}},\ 0\le k<L,$$

where n is a time-domain signal index value, k is a frequency-domain signal index value, Length is a frame length, L is a time-to-frequency conversion length for converting a time-domain signal into a frequency-domain signal, $x_L(n)$ and $x_R(n)$ are respectively left- and right-channel time-domain signals, and L(k) and R(k) are respectively $k^{th}$ frequency values of a left-channel frequency-domain signal and a right-channel frequency-domain signal that are used to calculate an IPD parameter.

A Fourier transformation coefficient X(k) of a real number sequence x(n) (including $X_L(n)$ or $x_R(n)$) is a complex number. A real part of X(k) has even symmetry, and an imaginary part of X(k) has odd symmetry. For example, X(k) has the following conjugate symmetry. Both X(0) and X(N/2) are real numbers, and the following relational expressions hold true:

$$X(k)=X^*(N-k), \text{ and } 1\le k\le L/2-1.$$

During discrete Fourier transformation calculation, due to the conjugate symmetry, there may be no need to calculate or store X(k), L/2+1≤k≤L−1, or imaginary parts of X(0) and X(L/2), and only X(0) to X(L/2) need to be calculated.

After converting the left- and right-channel time-domain signals of the current frame into the left- and right-channel frequency-domain signals, the encoder may calculate the left-right channel coherence value of the current frame based on the left- and right-channel frequency-domain signals. Further, an expression for the left-right channel coherence value is as follows:

$$\text{corr}=\frac{\left(\sum_{k=1}^{L/2-1}|L(k)R^*(k)|\right)^2}{\sum_{k=1}^{L/2-1}(|L(k)|)^2\sum_{k=1}^{L/2-1}(|R(k)|)^2},$$

where L is the time-to-frequency conversion length for converting the time-domain signal into the frequency-domain signal, L(k) and R(k) are respectively the $k^{th}$ frequency values of the left-channel frequency-domain signal and the right-channel frequency-domain signal that are used to calculate the IPD parameter, and R*(k) is a conjugate of R(k), that is, R*(k) is a conjugate of the $k^{th}$ frequency value of the right-channel frequency-domain signal.

In some feasible implementations, after converting the left- and right-channel time-domain signals of the current frame into the left- and right-channel frequency-domain signals on a per-frame basis or on a per-subframe basis, the encoder may calculate, based on the left- and right-channel frequency-domain signals, the parameter that is of the current frame and that represents left-right channel coherence. Further, expressions for the parameter that represents left—right channel coherence are as follows:

$$E_l(b)=\sum_{k=0}^{L}|L(k)|^2,$$

$$E_r(b)=\sum_{k=0}^{L}|R(k)|^2,$$

$$D_r(b)=\sum_{k=0}^{L}[L_r(k)\cdot R_r(k)+L_i(k)\cdot R_i(k)],$$

$$D_i(b)=\sum_{k=0}^{L}[L_i(k)\cdot R_r(k)+L_r(k)\cdot R_i(k)],$$

$$\text{and corr}=\sum_{b=0}^{N}\frac{[E_l(b)+E_r(b)+2\cdot D_r(b)]}{\left[E_l(b)+E_r(b)+2\sqrt{D_r^2(b)+D_i^2(b)}\right]},$$

where L(k) and R(k) are respectively the $k^{th}$ frequency values of the left-channel frequency-domain signal and the right-channel frequency-domain signal, $L_r(k)$ and $R_r(k)$ are respectively real parts of the $k^{th}$ frequency values of the left-channel frequency-domain signal and the right-channel frequency-domain signal, $L_i(k)$ and $R_i(k)$ are respectively imaginary parts of the $k^{th}$ frequency values of the left-channel frequency-domain signal and the right-channel frequency-domain signal, L is a quantity of subband spectral coefficients, and N is a quantity of subbands.

Alternatively, an expression for the parameter that represents left-right channel coherence is as follows:

$$\text{corr} = \sum_{i=0}^{L} \frac{|L(k)+R(k)|^2}{(|L(k)|+|R(k)|)^2},$$

where L is a quantity of spectral coefficients of all or some frequency bands.

Alternatively, an expression for the parameter that represents left-right channel coherence is as follows:

$$\text{corr} = \frac{\left(\sum_{k=1}^{L/2-1} |L(k)R^*(k)|\right)^2}{\sum_{k=1}^{L/2-1}(|L(k)|)^2 \sum_{k=1}^{L/2-1}(|R(k)|)^2}.$$

In some feasible implementations, after converting the left- and right-channel time-domain signals of the current frame into the left- and right-channel frequency-domain signals, the encoder may further calculate the subband IPD variance of the current frame based on the left- and right-channel frequency-domain signals. Further, the left- and right-channel frequency-domain signals of the current frame may be first divided into at least two subbands (that is, a plurality of subbands). It is assumed that there are $N_{subband}$ subbands, where $N_{subband}$ is an integer greater than 2. Further, an IPD parameter of each subband may be calculated based on a frequency-domain signal of each subband obtained through division, and the subband IPD variance of the current frame may be calculated based on the IPD parameter of each subband. For a $b^{th}$ subband, where b is an integer greater than or equal than 0 and less than $N_{subband}$, and the $b^{th}$ subband includes a frequency $A_{b-1} \le k \le A_b - 1$, an IPD parameter of the $b^{th}$ subband may be calculated using the following expression:

$$IPD(b) = \arg \sum_{k=A_{b1}}^{A_b 1} L(k)R^*(k),\ 0 \leqslant b < N_{subband},$$

where L(k) is the $k^{th}$ frequency value of the left-channel frequency-domain signal, and R*(k) is a conjugate of the $k^{th}$ frequency value of the right-channel frequency-domain signal.

The encoder may calculate the IPD parameter of each subband based on the foregoing expression, and then calculate the subband IPD variance of the current frame based on the IPD parameter of each subband. The subband IPD variance may be calculated using the following expression:

$$\text{var} = \frac{1}{N_{subband}} \sum_{b=0}^{N_{subband}-1} (IPD(b) - avr)^2,$$

$$\text{where } IPD(b) = \arg \sum_{k=A_{b1}}^{A_b 1} L(k)R^*(k),$$

$$\text{and } avr = \frac{1}{N_{subband}} \sum_{b=0}^{N_{subband} 1} IPD(b).$$

After the encoder obtains the left-right channel coherence value of the current frame and the subband IPD variance of the current frame, if the encoder needs to determine the IPD parameter extraction manner for the current frame of multi-channel signal based on the left-right channel coherence value of the current frame and the subband IPD variance of the current frame, the encoder may directly determine the IPD parameter extraction manner using the left-right channel coherence value of the current frame and the subband IPD variance of the current frame.

After the encoder determines the parameter that is of the current frame and that represents left-right channel coherence and the subband IPD variance of the current frame, if the encoder needs to determine the IPD parameter extraction manner for the current frame of multi-channel signal based on the parameter that is of the current frame and that represents left-right channel coherence and the subband IPD variance of the current frame, the encoder may directly determine the IPD parameter extraction manner using the parameter that is of the current frame and that represents left-right channel coherence and the subband IPD variance of the current frame.

Step S102. Determine an IPD parameter extraction manner for the current frame of multi-channel signal based on the parameter used to determine the information extraction manner for the current frame of the multi-channel signal.

During specific implementation, in the IPD parameter extraction method provided in this embodiment of the present disclosure, the encoder may adaptively select the IPD parameter extraction manner for the current frame of multi-channel signal based on the parameter used to determine the information extraction manner for the current frame, that is, select one of a plurality of preset IPD parameter extraction manners as the IPD parameter extraction manner for the current frame of multi-channel signal. The plurality of preset IPD parameter extraction manners may include a first extraction manner and a second extraction manner. The first extraction manner includes extracting a group IPD, or extracting no IPD parameter of the current frame of multi-channel signal, or setting the IPD parameter of the current frame of multi-channel signal to 0. The second extraction manner includes extracting subband set IPD parameters, extracting subband IPD parameters, or the like. In combination with step S103, the following describes implementations of determining of the IPD parameter extraction manner for the current frame of multi-channel signal and IPD parameter extraction corresponding to various IPD parameter extraction manners.

Step S103. Extract an IPD parameter of the current frame of multi-channel signal based on the determined IPD parameter extraction manner for the current frame of multi-channel signal.

In some feasible implementations, the encoder may first determine, based on the parameter used to determine the information extraction manner for the current frame of the multi-channel signal, whether the IPD parameter extraction manner for the current frame of multi-channel signal is the first extraction manner. If yes, based on the corresponding extraction manner, the encoder extracts a group IPD of the current frame of multi-channel signal, or extracts no IPD parameter, or sets the IPD parameter of the current frame of multi-channel signal to 0. Otherwise, the encoder may directly determine that the IPD parameter extraction manner for the current frame of multi-channel signal is extracting subband set IPD parameters or extracting subband IPD parameters. In this case, during actual application, it may have been determined that the second extraction manner is one of the two extraction manners, and therefore, which one of the two extraction manners is further used is determined once it is determined to use the second extraction manner. Alternatively, the encoder may further determine, based on the parameter used to determine the information extraction manner for the current frame of the multi-channel signal, whether the IPD parameter extraction manner for the current frame of multi-channel signal is extracting subband set IPD parameters or extracting subband IPD parameters.

In some feasible implementations, if the parameter that is obtained by the encoder and that is used to determine the information extraction manner for the current frame of the multi-channel signal includes the left-right channel coherence value of the current frame and the subband IPD variance of the current frame, the left-right channel coherence value of the current frame may be compared with a predefined first threshold, and the subband IPD variance of the current frame may be compared with a predefined second threshold. A value range of the predefined first threshold is [0.6, 0.95], and a value range of the predefined second threshold is [0.05, 0.5]. During specific implementation, a value of the first threshold may be 0.89, 0.8, 0.75, or the like. 0.89 may be a maximum value, 0.8 may be an intermediate value, and 0.75 may be a minimum value. The first threshold may be determined depending on actual application scenarios, and is not limited herein. A value of the second threshold may be 0.45, 0.25, 0.3, or the like. 0.45 may be a maximum value, 0.3 may be an intermediate value, and 0.25 may be a minimum value. The second threshold may be further determined depending on actual application scenarios, and is not limited herein. If it is learned through comparison that the left-right channel coherence value of the current frame is greater than the first threshold and the subband IPD variance of the current frame is less than the second threshold, it may be determined that the IPD parameter extraction manner for the current frame of multi-channel signal is the first extraction manner. Otherwise, it is determined that the IPD parameter extraction manner for the current frame of multi-channel signal is not the first extraction manner.

Optionally, in some feasible implementations, if the parameter that is obtained by the encoder and that is used to determine the information extraction manner for the current frame of the multi-channel signal is the parameter that is of the current frame and that represents left-right channel coherence, a value of the parameter that is of the current frame and that represents left— right channel coherence may be compared with a predefined first threshold. If the value of the parameter that is of the current frame and that represents left-right channel coherence is greater than the first threshold, it is determined that the IPD parameter extraction manner for the current frame of multi-channel signal is the first extraction manner, for example, may be setting the IPD parameter of the current frame of multi-channel signal to 0, or may be extracting a group IPD, or may be extracting no IPD parameter of the current frame of multi-channel signal. A value range and a specific value of the first threshold may be those described above. For example, the first threshold may be 0.75.

Optionally, in some feasible implementations, if the parameter that is obtained by the encoder and that is used to determine the information extraction manner for the current frame of the multi-channel signal is the signal feature parameter of each of the A frames previous to the current frame, including the IPD parameter extraction manner for each of the A frames previous to the current frame and the signal class of each of the A frames previous to the current frame, it may be determined whether the IPD parameter extraction manner for each of the A frames previous to the current frame is a preset IPD parameter extraction manner, and whether the signal class of each of the A frames previous to the current frame is a preset signal class. If the IPD parameter extraction manner for each of the A frames previous to the current frame is the first extraction manner, and the signal class of each of the A frames previous to the current frame is music frame, it may be determined that the IPD parameter extraction manner for the current frame of multi-channel signal is the first extraction manner.

For example, when A=1, the A frames previous to the current frame are one frame previous to the current frame. If an IPD parameter extraction manner for the one frame previous to the current frame is the first extraction manner, and a signal class of the one frame previous to the current frame is music frame, it may be determined that the IPD parameter extraction manner for the current frame of multi-channel signal is the first extraction manner. Otherwise, it is determined that the IPD parameter extraction manner for the current frame of multi-channel signal is not the first extraction manner.

When A=2, the A frames previous to the current frame are two frames previous to the current frame. If an IPD parameter extraction manner for each of the two frames previous to the current frame is the first extraction manner, and a signal class of each of the two frames previous to the current frame is music frame, it may be determined that the IPD parameter extraction manner for the current frame of multi-channel signal is the first extraction manner. Otherwise, it is determined that the IPD parameter extraction manner for the current frame of multi-channel signal is not the first extraction manner.

In some feasible implementations, if the parameter that is obtained by the encoder and that is used to determine the information extraction manner for the current frame of the multi-channel signal includes the ITD of the current frame, the subband IPD variance of the current frame, and the signal class of each of the A frames previous to the current frame, an absolute value of the ITD of the current frame may be compared with a predefined third threshold, and the subband IPD variance of the current frame may be compared with a predefined fourth threshold. It may be further determined whether the signal class of each of the A frames previous to the current frame is a target signal class. A value range of the predefined third threshold is [0, 4], and a value range of the predefined fourth threshold is [0.05, 0.4]. A value of the third threshold may be 4, 2, 0, or the like. 4 may be a maximum value, 2 may be an intermediate value, and 0 may be a minimum value. The third threshold may be determined depending on actual application scenarios, and is not limited herein. A value of the fourth threshold may be 0.4, 0.35, 0.25, or the like. 0.4 may be a maximum value, 0.35 may be an intermediate value, and 0.25 may be a minimum value. The fourth threshold may be determined depending on actual application scenarios, and is not limited herein. The target signal class is speech frame. If it is learned through comparison that the absolute value of the ITD of the current frame is greater than the third threshold, the subband IPD variance of the current frame is less than the fourth threshold, and the signal class of each of the A frames previous to the current frame is speech frame, it may be determined that the IPD parameter extraction manner for the current frame of multi-channel signal is the first extraction manner. Otherwise, it is determined that the IPD parameter extraction manner for the current frame of multi-channel signal is not the first extraction manner.

The A frames previous to the current frame may include one frame previous to the current frame, two frames previous to the current frame, three frames previous to the current frame, or the like. This is not limited herein. If the A frames previous to the current frame are one frame previous to the current frame, when the absolute value of the ITD of the current frame is greater than the third threshold, the subband IPD variance of the current frame is less than the fourth threshold, and a signal class of the one frame previous to the current frame is speech frame, it may be determined that the IPD parameter extraction manner for the current frame of multi-channel signal is extracting a group IPD. If the A frames previous to the current frame are a plurality of frames previous to the current frame, when the absolute value of the ITD of the current frame is greater than the third threshold, the subband IPD variance of the current frame is less than the fourth threshold, and a signal class of each of the plurality of frames previous to the current frame is speech frame, it may be determined that the IPD parameter extraction manner for the current frame of multi-channel signal is the first extraction manner.

In some feasible implementations, after determining the IPD parameter extraction manner for the current frame of multi-channel signal, the encoder encodes a flag bit of the IPD parameter extraction manner for the current frame of multi-channel signal, and then quantizes the IPD parameter of the current frame of multi-channel signal based on different extraction manners in different manners.

In some feasible implementations, after determining that the IPD parameter extraction manner for the current frame of multi-channel signal is the first extraction manner, the encoder may extract the IPD parameter of the current frame of multi-channel signal based on the first extraction manner. Further, if the first extraction manner is extracting no IPD parameter of the current frame of multi-channel signal, no operation is performed, and a process corresponding to extraction of the IPD parameter of the current frame ends. If the first extraction manner is setting the IPD parameter of the current frame of multi-channel signal to 0, a value of the extracted IPD parameter of the current frame of multi-channel signal is set to 0. If the first extraction manner is extracting a group IPD parameter of the current frame of multi-channel signal, the group IPD of the current frame of multi-channel signal may be extracted based on the manner of extracting a group IPD parameter. The extracted group IPD of the current frame of multi-channel signal is used as the IPD parameter of the current frame of multi-channel signal. Further, the encoder may extract IPD parameters of at least some subbands of the left- and right-channel frequency-domain signals of the current frame. The at least some subbands of the left- and right-channel frequency-domain signals of the current frame may further include all or some of the $N_{subband}$ subbands obtained by dividing the left- and right-channel frequency-domain signals of the current frame. This is not limited herein. During specific implementation, the encoder may determine, based on a coding requirement on multi-channel signal coding, for example, a coding rate or coding quality, frequency-domain ranges of the left- and right-channel frequency-domain signals of the current frame that are used to extract the group IPD of the current frame of multi-channel signal, including frequency-domain signals in the entire frequency domain ranges of the left- and right-channel frequency-domain signals of the current frame, that is, frequency-domain signals of all subbands of the left- and right-channel frequency-domain signals of the current frame, or specific frequency domain ranges of the left- and right-channel frequency-domain signals of the current frame, that is, some frames of frequency-domain signals in the left- and right-channel frequency-domain signals of the current frame. The some frames of frequency-domain signals in the left- and right-channel frequency-domain signals of the current frame are included in frequency-domain signals of some subbands of the left- and right-channel frequency-domain signals.

In some feasible implementations, if the encoder determines that the frequency domain ranges of the left- and right-channel frequency-domain signals of the current frame that are used to extract a group IPD of the left- and right-channel frequency-domain signals of the current frame are the entire frequency domain ranges of the left- and right-channel frequency-domain signals of the current frame, IPD parameters of all the subbands of the left- and right-channel frequency-domain signals of the current frame (that is, the $N_{subband}$ subbands of the current frame) may be extracted, an average of all the extracted IPD parameters of the subbands may be calculated, and then the obtained average of all the extracted IPD parameters of the subbands may be used as the group IPD of the current frame of multi-channel signal. The group IPD of the current frame of multi-channel signal is extracted based on the following formula:

$$\text{G\_IPD} = \frac{1}{N_{subband}} \sum_{b=0}^{N_{subband} 1} IPD(b),$$

where G_IPD is the group IPD of the current frame of multi-channel signal, and IPD(b) is an IPD parameter of a $b^{th}$ subband.

Feasibly, in some feasible implementations, if the encoder determines that the frequency domain ranges of the left- and right-channel frequency-domain signals of the current frame that are used to extract a group IPD of the left- and right-channel frequency-domain signals of the current frame are specific frequency domain ranges of the left- and right-channel frequency-domain signals of the current frame, for example, [k1, k2], that is, frequency-domain signals between a $k1^{th}$ frequency and a $k2^{th}$ frequency, IPD parameters of some subbands (that is, subbands to which the frequency-domain signals between the $k1^{th}$ frequency and the $k2^{th}$ frequency belong) of the left- and right-channel frequency-domain signals of the current frame may be extracted, an average of all the extracted IPD parameters of the subbands may be calculated, and then the obtained average of all the IPD parameters of the subbands may be used as the group IPD of the current frame of multi-channel signal.

During specific implementation, the IPD parameters of the subbands to which the frequency-domain signals between the $k1^{th}$ frequency and the $k2^{th}$ frequency belong may be predefined as IPD parameters of all frequencies. In this case, calculation of the IPD parameters of the subbands may be replaced with calculation of the IPD parameters of all the frequencies, and an IPD parameter of each frequency is calculated as an IPD parameter of each subband to calculate the group IPD of the current frame of multi-channel signal. The IPD parameters of all the frequencies in the preset frequency domain range [k1, k2] are calculated one by one in the following manner:

$$IPD(k)=\angle L(k)R^*(k), k_1 \le k \le k_2,$$

where L(k) is the $k^{th}$ frequency value of the left-channel frequency-domain signal, and R*(k) is the conjugate of the $k^{th}$ frequency value of the right-channel frequency-domain signal.

Further, statistical processing is performed on IPD(k) in a preset range (a plurality of frames, including the current frame and the A frames previous to the current frame, of signals in a multi-channel frequency-domain signal), to obtain the group IPD parameter.

For example, if the specific frequency domain range [k1, k2] is a selection range of each of six frames of left- and right-channel frequency-domain signals, an average of IPD parameters of (k2−k1+1) frequencies in each of the six frames of left- and right-channel frequency-domain signals may be calculated. A calculation formula is as follows:

$$M_{IPD}^{[0]} = \frac{1}{k_2 - k_1 + 1} \sum_{k=k_1}^{k_2} IPD(k).$$

Further, an average of IPD parameters of six consecutive frames including the current frame may be calculated and used as the group IPD of the current frame of multi-channel signal:

$$M_{IPD} = \frac{1}{6} \sum_{i=-5}^{0} M_{IPD}^{[i]},$$

where $M_{IPD}^{[-1]}$ is an average of IPD parameters of one previous frame adjacent to the current frame, $M_{IPD}^{[-2]}$ is an average of IPD parameters of two frames previous to the current frame, and so on.

In some feasible implementations, if the encoder determines that the IPD parameter extraction manner for the current frame of multi-channel signal is not the first extraction manner, it may be directly determined that the IPD parameter extraction manner for the current frame of multi-channel signal is extracting subband set IPD parameters or extracting subband IPD parameters.

In some feasible implementations, if the encoder determines that the IPD parameter extraction manner for the current frame of multi-channel signal is not the first extraction manner, the encoder may further determine the IPD parameter extraction manner for the current frame of multi-channel signal. Further, the encoder may classify subbands of the left- and right-channel frequency-domain signals of the current frame into at least two subband sets (that is, a plurality of subband sets). Each subband set includes one or more subbands. Further, the encoder may obtain a subband IPD variance of each subband set. If the subband IPD variance of each subband set is less than the second threshold, and the left-right channel coherence value of the current frame is greater than the first threshold, the encoder may determine that the IPD parameter extraction manner for the current frame of multi-channel signal is extracting subband set IPD parameters. Then the encoder may calculate an IPD parameter of each subband set, and use the obtained IPD parameter of each subband set as the IPD parameter of the current frame of multi-channel signal.

In some feasible implementations, if the encoder determines that the IPD parameter extraction manner for the current frame of multi-channel signal is not the first extraction manner, the encoder may further determine the IPD parameter extraction manner for the current frame of multi-channel signal. Further, the encoder may classify subbands of the left- and right-channel frequency-domain signals of the current frame into at least two subband sets (that is, a plurality of subband sets). Each subband set includes one or more subbands. Further, the encoder may obtain a subband IPD variance of each subband set. If the subband IPD variance of each subband set is less than the second threshold, and the value of the parameter that is of the current frame and that represents left-right channel coherence is greater than the first threshold, the encoder may determine that the IPD parameter extraction manner for the current frame of multi-channel signal is extracting subband set IPD parameters. Then the encoder may calculate an IPD parameter of each subband set, and use the obtained IPD parameter of each subband set as the IPD parameter of the current frame of multi-channel signal.

Figure 4A:
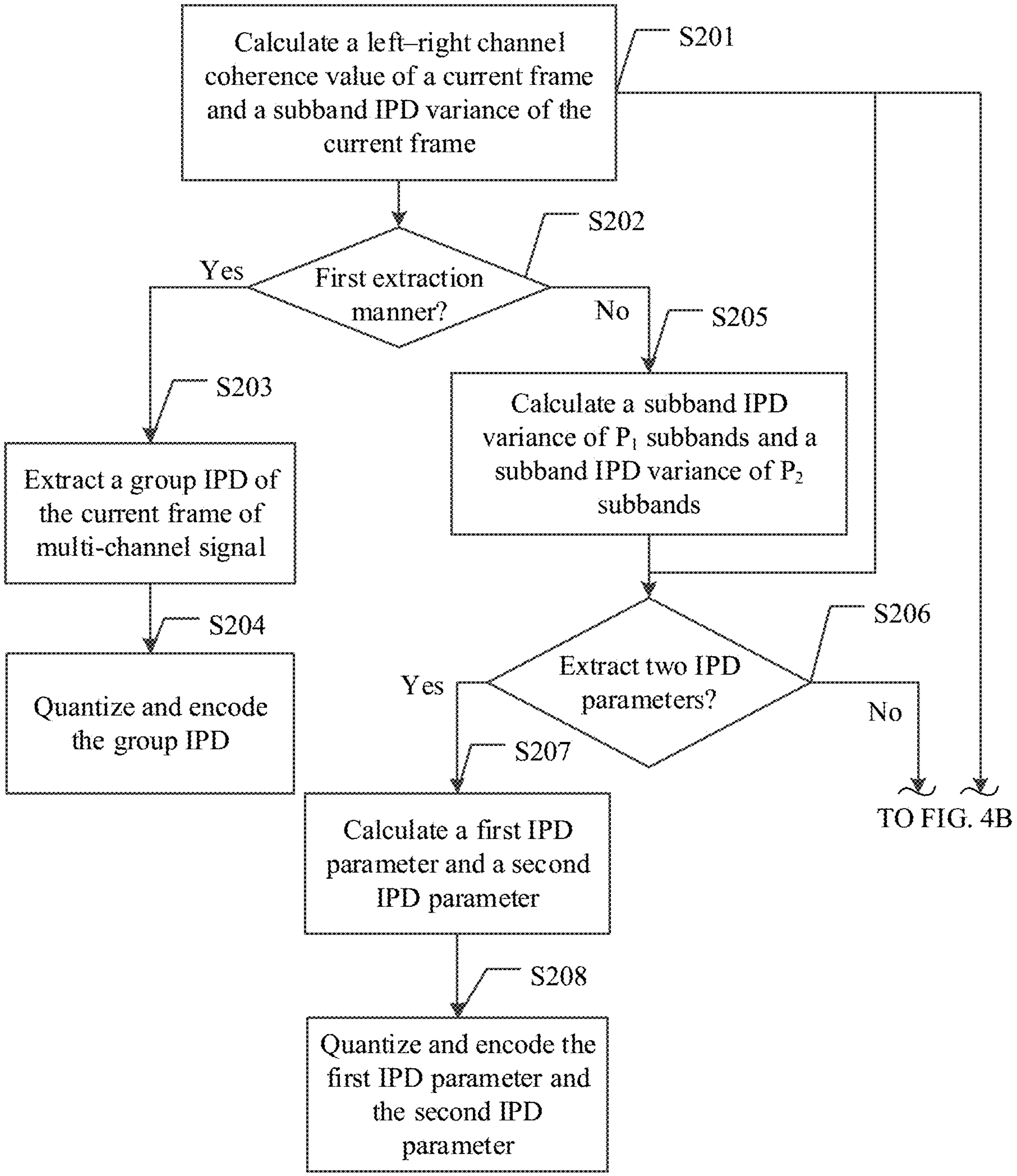
FIG. 4A and FIG. 4B are another schematic flowchart of an IPD parameter extraction method according to an embodiment of the present disclosure.
Figure 4B:
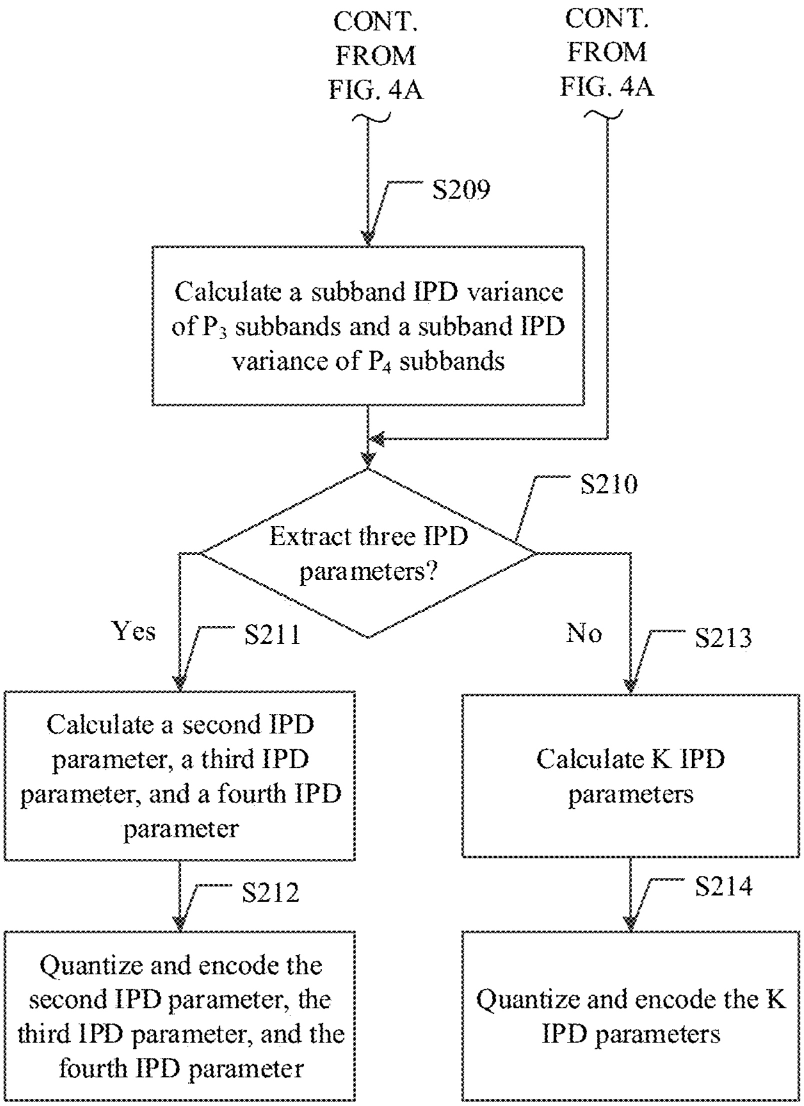

For example, referring to FIG. 4A and FIG. 4B, FIG. 4A and FIG. 4B are another schematic flowchart of an IPD parameter extraction method according to an embodiment of the present disclosure. The method includes the following steps.

Step S201. Calculate a left-right channel coherence value of a current frame and a subband IPD variance of the current frame.

In some implementations, step S201 may be determining a value of a parameter that is of the current frame and that represents a left-right channel coherence and the subband IPD variance of the current frame.

Step S202. Determine whether an IPD parameter extraction manner for the current frame of multi-channel signal is a first extraction manner, and if a determining result is yes, perform step S203, or otherwise, perform step S205.

An encoder may determine, based on the left-right channel coherence value between left- and right-channel frequency-domain signals of the current frame and the subband IPD variance of the current frame, whether the IPD parameter extraction manner for the current frame of multi-channel signal is the first extraction manner. For a specific determining method, refer to the foregoing embodiment, and details are not described herein again.

Alternatively, the encoder may determine, based on the value of the parameter that is of the current frame and that represents left-right channel coherence and the subband IPD variance of the current frame, whether the IPD parameter extraction manner for the current frame of multi-channel signal is the first extraction manner. For a specific determining method, refer to the foregoing embodiment, and details are not described herein again.

Step S203. Extract a group IPD of the current frame of multi-channel signal.

Step S204. Quantize and encode the group IPD.

If the encoder determines that the IPD parameter extraction manner for the current frame of multi-channel signal is extracting a group IPD, the encoder may extract the group IPD of the current frame of multi-channel signal. For a specific extraction manner, refer to the foregoing embodiment, and details are not described herein again. After extracting the group IPD of the current frame of multi-channel signal, the encoder may perform operations such as quantization and encoding on the group IPD. For a specific quantization and encoding manner, refer to an implementation described in a standard protocol, and details are not described herein.

Step S205. Calculate a subband IPD variance of $P_1$ subbands and a subband IPD variance of $P_2$ subbands.

Step S206. Determine whether the IPD parameter extraction manner for the current frame of multi-channel signal is extracting two IPD parameters, and if a determining result is yes, perform step S207, or otherwise, perform step S209.

If the encoder determines that the IPD parameter extraction manner for the current frame of multi-channel signal is not extracting a group IPD, the encoder may classify subbands of the left- and right-channel frequency-domain signals of the current frame into two subband sets including a subband set 1 (the subband set 1 includes $P_1$ subbands) and a subband set 2 (the subband set 2 includes $P_2$ subbands), and then may calculate a subband IPD variance (referred to as a first variance) of the subband set 1 (that is, the $P_1$ subbands) and a subband IPD variance (referred to as a second variance) of the subband set 2 (that is, the $P_2$ subbands). A sum of $P_1$ and $P_2$ is equal to $N_{subband}$. When the left-right channel coherence value between the left- and right-channel frequency-domain signals of the current frame is greater than a first threshold, and both the first variance and the second variance are less than a second threshold, the encoder determines that the IPD parameter extraction manner for the current frame of multi-channel signal is extracting two IPD parameters, that is, extracting IPD parameters of two subband sets. Alternatively, when the value of the parameter that is of the current frame and that represents left-right channel coherence between the left- and right-channel frequency-domain signals is greater than a first threshold, and both the first variance and the second variance are less than a second threshold, the encoder determines that the IPD parameter extraction manner for the current frame of multi-channel signal is extracting two IPD parameters, that is, extracting IPD parameters of two subband sets.

The first variance is calculated in the following manner:

$$\text{var}_1 = \frac{1}{P_1}\sum_{b=0}^{P_1-1}(IPD(b) - avr_1)^2,$$

$$\text{and } avr_1 = \frac{1}{P_1}\sum_{b=0}^{P_1-1} IPD(b).$$

The second variance is calculated in the following manner:

$$\text{var}_2 = \frac{1}{P_2}\sum_{b=P_1}^{P_1+P_2-1}(IPD(b) - avr_2)^2,$$

$$\text{and } avr_2 = \frac{1}{P_2}\sum_{b=P_1}^{N_{subband}-1} IPD(b).$$

Step S207. Calculate a first IPD parameter and a second IPD parameter.

Step S208. Quantize and encode the first IPD parameter and the second IPD parameter.

Further, after determining that the IPD parameter extraction manner for the current frame of multi-channel signal is extracting two IPD parameters, the encoder may separately calculate the first IPD parameter corresponding to the subband set 1 and the second IPD parameter corresponding to the subband set 2. A method for calculating the first IPD parameter and a method for calculating the second IPD parameter may be the same as the foregoing method for calculating the group IPD. For details, refer to the foregoing embodiment, and details are not described herein again. After calculating the first IPD parameter and the second IPD parameter, the encoder may quantize and encode the first IPD parameter and the second IPD parameter. For a specific quantization and encoding manner, refer to an implementation described in a standard protocol, and details are not described herein.

Step S209. Calculate a subband IPD variance of $P_3$ subbands and a subband IPD variance of $P_4$ subbands.

Step S210. Determine whether the IPD parameter extraction manner for the current frame of multi-channel signal is extracting three IPD parameters, and if a determining result is yes, perform step S211, or otherwise, perform step S213.

Further, if the IPD parameter extraction manner for the current frame of multi-channel signal is not extracting two IPD parameters, the subband set 1 may be divided to obtain finer subband sets (for example, a subband set 3 and a subband set 4, where the subband set 3 includes $P_3$ subbands, the subband set 4 includes $P_4$ subbands, and $P_3+P_4=P_1$). Then subband IPD variances of all subband sets (the subband set 2, the subband set 3, and the subband set 4) may be calculated. The subband IPD variances include a second variance, a third variance, and a fourth variance. For manners for calculating the third variance (that is, a subband IPD variance of the $P_3$ subbands) and the fourth variance (that is, a subband IPD variance of the $P_4$ subbands), refer to the foregoing manners for calculating the first variance and the second variance, and details are not described herein again. When the left-right channel coherence value of the current frame is greater than the first threshold, and the second variance, the third variance, and the fourth variance are all less than the second threshold, the encoder determines that the IPD parameter extraction manner for the current frame of multi-channel signal is extracting three IPD parameters.

Step S211. Calculate a second IPD parameter, a third IPD parameter, and a fourth IPD parameter.

Step S212. Quantize and encode the second IPD parameter, the third IPD parameter, and the fourth IPD parameter.

After determining that the IPD parameter extraction manner for the current frame of multi-channel signal is extracting three IPD parameters, the encoder may separately extract the second IPD parameter corresponding to the subband set 2, the third IPD parameter corresponding to the subband set 3, and the fourth IPD parameter corresponding to the subband set 4, and then may quantize and encode the second IPD parameter, the third IPD parameter, and the fourth IPD parameter. For a specific quantization and encoding manner, refer to an implementation described in a standard protocol, and details are not described herein. Methods for calculating the second IPD parameter, the third IPD parameter, and the fourth IPD parameter may be the same as the foregoing method for calculating the group IPD. For details, refer to the foregoing embodiment, and details are not described herein again.

The third variance is calculated in the following manner:

$$\mathrm{var}_3 = \frac{1}{P_3}\sum_{b=0}^{P_3-1}(IPD(b)-avr_3)^2,$$

$$\text{and } avr_3 = \frac{1}{P_3}\sum_{b=0}^{P_3-1}IPD(b).$$

The fourth variance is calculated in the following method:

$$\mathrm{var}_4 = \frac{1}{P_4}\sum_{b=P_3}^{P_1-1}(IPD(b)-avr_4)^2,$$

$$avr_4 = \frac{1}{P_4}\sum_{b=P_3}^{P_1-1}IPD(b),$$

and $1 \le P_3, P_4 < P_1$, and $P_3 + P_4 = P_1$.

Step S213. Calculate K IPD parameters.

Step S214. Quantize and encode the K IPD parameters.

It should be noted that this embodiment of the present disclosure is not limited to extraction of the first IPD parameter, the second IPD parameter, the third IPD parameter, and the fourth IPD parameter. When any one of the third variance, the fourth variance, and the second variance does not meet a condition, a calculation range may be further reduced, to calculate K IPD parameters and quantize and encode the K IPD parameters. M IPD extraction manners are finally implemented. Both K and M are integers greater than or equal to 4 and less than or equal to $N_{subband}$.

Optionally, in some optional implementations, if the encoder determines that the IPD parameter extraction manner for the current frame of multi-channel signal is not the first extraction manner, the encoder may obtain subband IPD variances of all subband sets, and if one or more of the obtained subband IPD variances of all the subband sets are greater than the second threshold, or the left-right channel coherence value of the current frame is less than or equal to the first threshold, the encoder may determine that the IPD parameter extraction manner for the current frame of multi-channel signal is a subband set IPD parameter extraction manner. Then the encoder may calculate IPD parameters of all subbands of the left- and right-channel frequency-domain signals of the current frame based on the left- and right-channel frequency-domain signals of the current frame, and use the extracted IPD parameters of all the subbands as the IPD parameter of the current frame of multi-channel signal. After determining that the IPD parameter extraction manner for the current frame of multi-channel signal is not the first extraction manner, the encoder may calculate the IPD parameters of all the $N_{subband}$ subbands of the left- and right-channel frequency-domain signals of the current frame, and then determine the IPD parameters of the $N_{subband}$ subbands as the IPD parameter of the current frame of multi-channel signal. For a manner for calculating the IPD parameters of all the subbands, refer to the foregoing implementation, and details are not described herein again.

Optionally, in some optional implementations, if the encoder determines that the IPD parameter extraction manner for the current frame of multi-channel signal is not the first extraction manner, the encoder may obtain subband IPD variances of all subband sets, and if one or more of the obtained subband IPD variances of all the subband sets are greater than the second threshold, or the value of the parameter that is of the current frame and that represents left-right channel coherence is less than or equal to the first threshold, the encoder may determine that the IPD parameter extraction manner for the current frame of multi-channel signal is extracting subband IPD parameters. Then the encoder may calculate IPD parameters of all subbands of the left- and right-channel frequency-domain signals of the current frame based on the left- and right-channel frequency-domain signals of the current frame, and use the extracted IPD parameters of all the subbands as the IPD parameter of the current frame of multi-channel signal. After determining that the IPD parameter extraction manner for the current frame of multi-channel signal is not the first extraction manner, the encoder may calculate the IPD parameters of all the $N_{subband}$ subbands of the left- and right-channel frequency-domain signals of the current frame, and then determine the IPD parameters of the $N_{subband}$ subbands as the IPD parameter of the current frame of multi-channel signal. For a manner for calculating the IPD parameters of all the subbands, refer to the foregoing implementation, and details are not described herein again.

Figure 5:
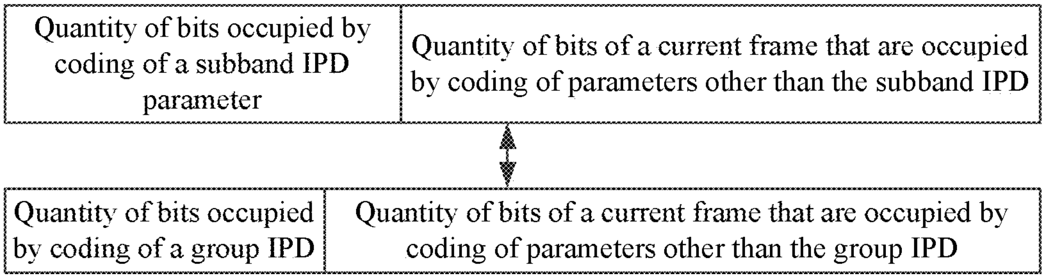
FIG. 5 is a schematic diagram of allocation of a total quantity of bits used for multi-channel signal coding.

Referring to FIG. 5, FIG. 5 is a schematic diagram of allocation of a total quantity of bits used for multi-channel signal coding. In this embodiment of the present disclosure, in an application scenario in which the total quantity of bits used for multi-channel signal coding is unchanged (that is, N1+M1=N2+M2), when the group IPD parameter extraction manner is used, a quantity of bits occupied by IPD parameter coding can be reduced, and more bits can be used for coding of other parameters, thereby reducing a coding rate while maintaining coding quality, when a second extraction manner (including extracting subband set IPD parameters and extracting subband IPD parameters) is used, a quantity of bits occupied by IPD parameter coding is greater than that when the manner of extracting a group IPD parameter is used, and an IPD parameter extraction manner can be adaptively selected to improve coding quality while maintaining a coding rate. N1 is a quantity of bits used for coding of a subband IPD parameter, M1 is a quantity of bits of the current frame that are used for coding of parameters other than the subband IPD parameter, N2 is a quantity of bits used for coding of a group IPD parameter, M2 is a quantity of bits of the current frame that are used for coding of parameters other than the group IPD parameter, and N1, N2, M1, and M2 are positive integers.

Figure 6A:
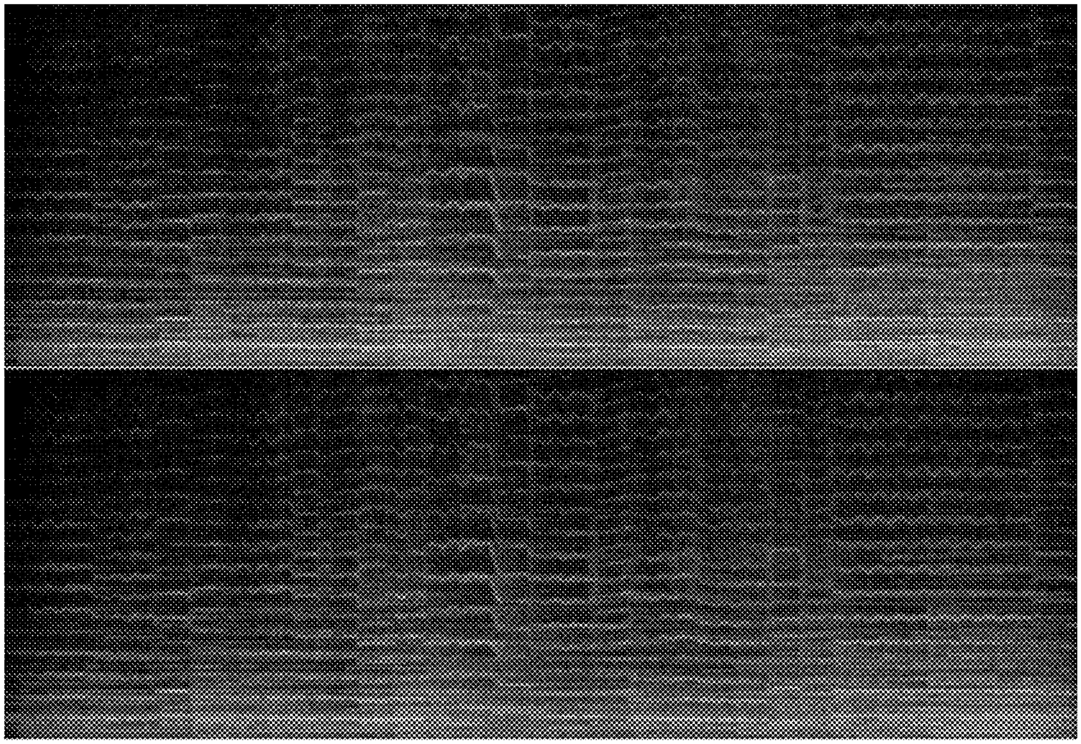
FIG. 6A is an original signal spectrogram of a multi-channel signal.
Figure 6B:
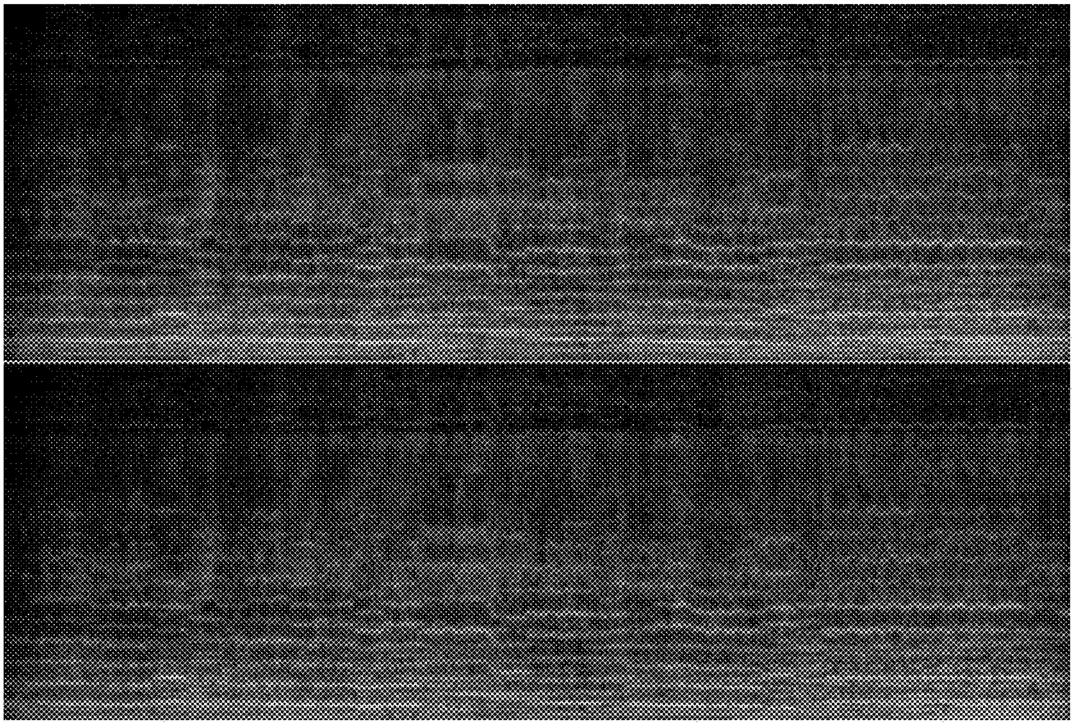
FIG. 6B is an audio signal spectrogram obtained by decoding an original signal spectrogram.
Figure 6C:
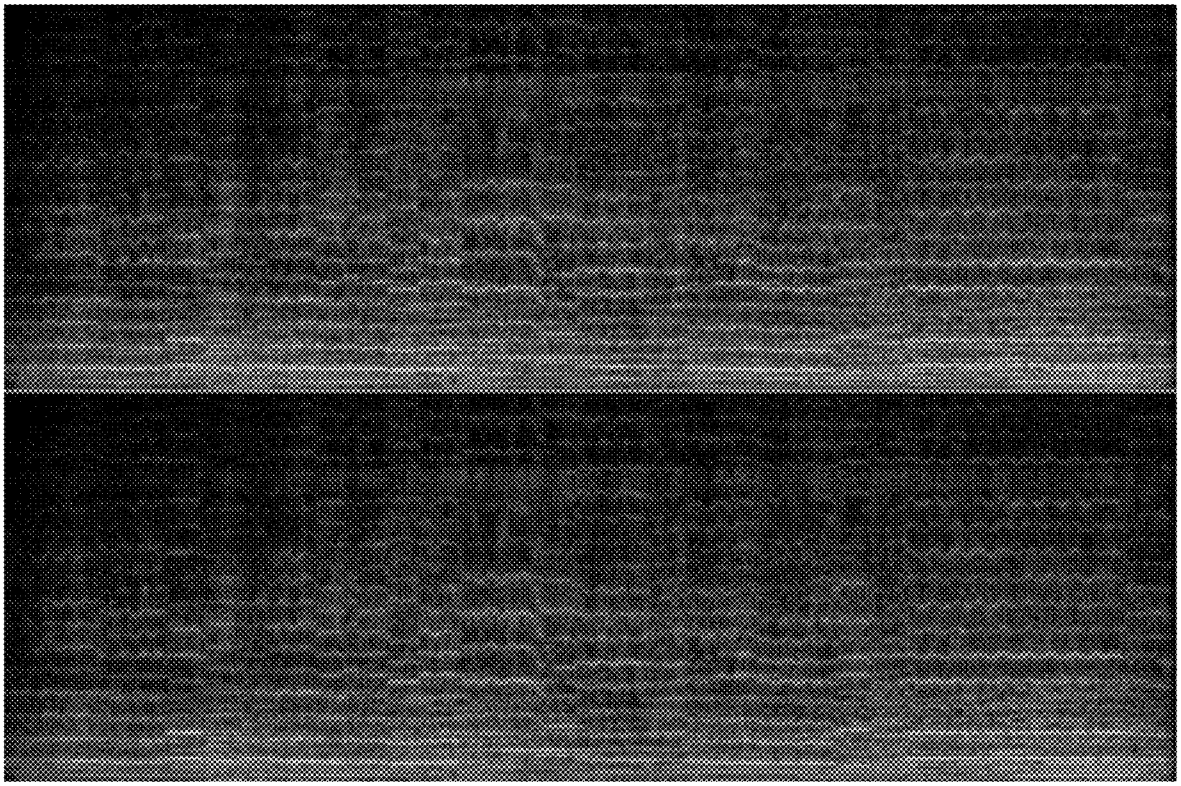
FIG. 6C is another audio signal spectrogram obtained by decoding an original signal spectrogram.

FIG. 6A to FIG. 6C show spectrograms for comparing effects of the IPD parameter extraction method (adaptive switching between the manner of extracting a group IPD parameter and the manner of extracting subband IPD parameters, where an IPD parameter extraction manner is adaptively determined based on a parameter used to determine an information extraction manner for a current frame) provided in this embodiment of the present disclosure and an existing technology (extracting subband IPD parameters of $N_{subband}$ subbands) on the premise that a total quantity of bits for coding is unchanged. FIG. 6A is an original signal spectrogram of a multi-channel signal, where the original signal is a harmonic signal. FIG. 6B is an audio signal spectrogram obtained by decoding, by a decoder according to a corresponding decoding algorithm, an IPD parameter that is extracted using an existing technology and that is encoded. As shown in FIG. 6B, a harmonic component of a high-frequency part (a circle part) of the original signal is not restored in an audio signal obtained by the decoder by decoding the original signal, and therefore the audio signal causes a relatively strong sense of noise to hearing, causing discomfort to the human ear. FIG. 6C is an audio signal spectrogram obtained by decoding, by a decoder based on a corresponding decoding algorithm, an IPD parameter that is extracted in the method provided in this embodiment of the present disclosure and that is encoded. As shown in FIG. 6C, a harmonic component of a high-frequency part of the original signal is well restored in an audio signal obtained by the decoder by decoding the original signal, and therefore the audio signal causes no sense of noise to hearing. It can be learned from a comparison result that in the method provided in this embodiment of the present disclosure, auditory quality of a finally output signal can be improved with a stereo signal phase maintained.

In this embodiment of the present disclosure, the encoder may preset a plurality of IPD parameter extraction manners such that when determining the IPD parameter extraction manner for the current frame of multi-channel signal, the encoder may determine the IPD parameter extraction manner for the current frame of multi-channel signal based on the obtained parameter used to determine the information extraction manner for the current frame of the multi-channel signal, thereby implementing adaptive selection among the IPD parameter extraction manners, and then the encoder may extract the IPD parameter of the current frame of multi-channel signal based on the determined IPD parameter extraction manner. In this embodiment of the present disclosure, choices of the IPD parameter extraction manner for the current frame of multi-channel signal are enriched, and the IPD parameter extraction manner for the current frame of multi-channel signal correlates with the parameter used to determine the information extraction manner for the current frame more closely. In this embodiment of the present disclosure, on the premise that the total quantity of bits used for multi-channel signal coding is unchanged, through adaptive selection among the IPD parameter extraction manners, when the group IPD parameter extraction manner is used, a quantity of bits occupied by IPD parameter coding can be reduced, and more bits can be used for coding of other parameters, thereby reducing a coding rate while maintaining coding quality, when a second extraction manner (including extracting subband set IPD parameters and extracting subband IPD parameters one by one) is used, a quantity of bits occupied by IPD parameter coding is greater than that when the group IPD parameter extraction manner is used, and an IPD parameter extraction manner can be adaptively selected to improve coding quality while maintaining a coding rate.

Figure 7:
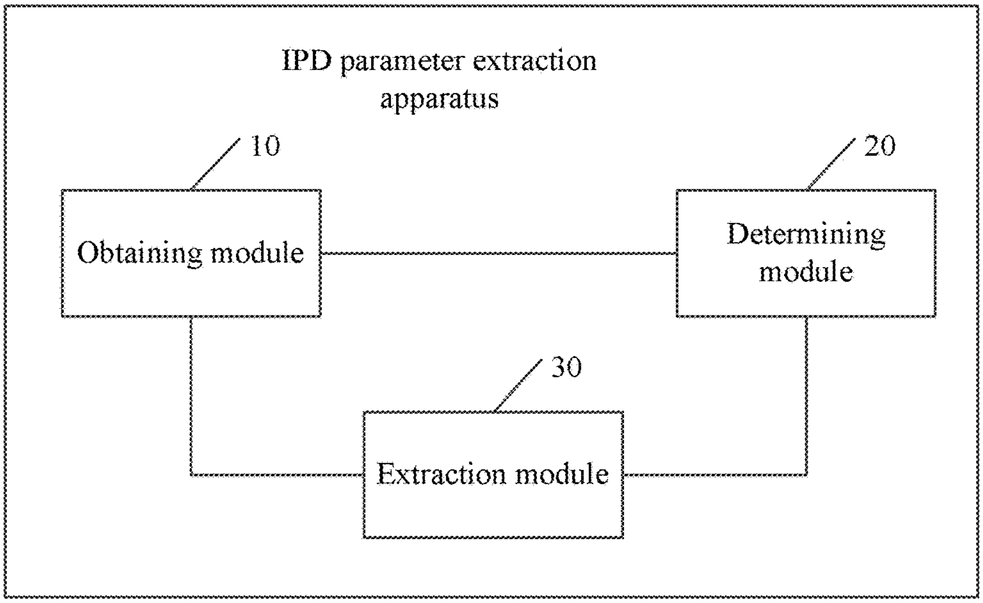
FIG. 7 is a schematic structural diagram of an IPD parameter extraction apparatus according to an embodiment of the present disclosure.

Referring to FIG. 7, FIG. 7 is a schematic structural diagram of an embodiment of an IPD parameter extraction apparatus according to the embodiments of the present disclosure. The extraction apparatus provided in this embodiment of the present disclosure includes an obtaining module 10 configured to obtain a parameter used to determine an information extraction manner for a current frame of a multi-channel signal, a determining module 20 configured to determine an IPD parameter extraction manner for the current frame of the multi-channel signal based on the parameter that is obtained by the obtaining module 10 and that is used to determine the information extraction manner for the current frame of the multi-channel signal, where the determined IPD parameter extraction manner for the current frame of multi-channel signal is one of at least two preset IPD parameter extraction manners, and an extraction module 30 configured to extract an IPD parameter of the current frame of multi-channel signal based on the IPD parameter extraction manner that is for the current frame of multi-channel signal and that is determined by the determining module 20.

In some feasible implementations, the parameter used to determine the information extraction manner for the current frame of the multi-channel signal includes at least one of a signal feature parameter of the current frame and a signal feature parameter of each of A frames previous to the current frame, where A is an integer not less than 1, the signal feature parameter of the current frame includes at least one of a left-right channel coherence value of the current frame, a parameter that is of the current frame and that represents a left-right channel coherence, a subband IPD variance of the current frame, a signal class of the current frame, and an ITD of the current frame, the signal feature parameter of each of the A frames previous to the current frame includes at least one of a left-right channel coherence value of each of the A frames previous to the current frame, a parameter that is of each of the A frames previous to the current frame and that represents a left-right channel coherence, a subband IPD variance of each of the A frames previous to the current frame, an ITD of each of the A frames previous to the current frame, an IPD parameter extraction manner for each of the A frames previous to the current frame, and a signal class of each of the A frames previous to the current frame, and the signal class includes speech frame or music frame.

In some feasible implementations, the parameter used to determine the information extraction manner for the current frame of the multi-channel signal includes the left-right channel coherence value of the current frame and the subband IPD variance of the current frame, and if the left-right channel coherence value of the current frame is greater than a first threshold, and the subband IPD variance of the current frame is less than a second threshold, the determining module 20 is further configured to determine that the IPD parameter extraction manner for the current frame of multi-channel signal is a first extraction manner.

In some feasible implementations, the parameter used to determine the information extraction manner for the current frame of the multi-channel signal includes the parameter that is of the current frame and that represents left-right channel coherence, and if a value of the parameter that is of the current frame and that represents left-right channel coherence is greater than a first threshold, the determining module 20 is further configured to determine that the IPD parameter extraction manner for the current frame of multi-channel signal is a first extraction manner. A value of the first threshold may be that described above, and details are not described herein again.

In some feasible implementations, the parameter used to determine the information extraction manner for the current frame of the multi-channel signal includes the IPD parameter extraction manner for each of the A frames previous to the current frame and the signal class of each of the A frames previous to the current frame, and if the IPD parameter extraction manner for each of the A frames previous to the current frame is a first extraction manner, and the signal class of each of the A frames previous to the current frame is music frame, the determining module 20 is further configured to determine that the IPD parameter extraction manner for the current frame of multi-channel signal is the first extraction manner.

In some feasible implementations, the parameter used to determine the information extraction manner for the current frame of the multi-channel signal includes the ITD of the current frame, the subband IPD variance of the current frame, and the signal class of each of the A frames previous to the current frame, and if a value of the ITD of the current frame is greater than a third threshold, the subband IPD variance of the current frame is less than a fourth threshold, and the signal class of each of the A frames previous to the current frame is speech frame, the determining module 20 is further configured to determine that the IPD parameter extraction manner for the current frame of multi-channel signal is a first extraction manner.

In some feasible implementations, the first extraction manner includes extracting a group IPD parameter of the current frame of multi-channel signal, or extracting no IPD parameter of the current frame of multi-channel signal, or setting the IPD parameter of the current frame of multi-channel signal to 0.

In some feasible implementations, when the determining module 20 determines that the IPD parameter extraction manner for the current frame of multi-channel signal is extracting a group IPD, the extraction module 30 is further configured to extract subband IPD parameters of left- and right-channel frequency-domain signals of the current frame, and determine a group IPD of the current frame of multi-channel signal based on the extracted subband IPD parameters.

In some feasible implementations, if the IPD parameter extraction manner for the current frame of multi-channel signal is not the first extraction manner, the determining module 20 is further configured to determine that the IPD parameter extraction manner for the current frame of multi-channel signal is a second extraction manner, where the second extraction manner includes extracting subband set IPD parameters or extracting subband IPD parameters.

In some feasible implementations, the second extraction manner is extracting subband set IPD parameters, and the determining module 20 is further configured to classify subbands of left- and right-channel frequency-domain signals of the current frame of multi-channel signal into at least two subband sets, where each subband set includes at least one subband, and at least one subband set includes at least two subbands, obtain a subband IPD variance of each subband set, and if the subband IPD variance of each subband set is less than the second threshold, and the left—right channel coherence value of the current frame is greater than the first threshold, determine that the IPD parameter extraction manner for the current frame of multi-channel signal is extracting subband set IPD parameters, and the extraction module 30 is further configured to calculate an IPD parameter of each of the at least two subband sets determined by the determining module 20.

In some feasible implementations, the second extraction manner is extracting subband set IPD parameters, and the determining module 20 is further configured to classify subbands of left- and right-channel frequency-domain signals of the current frame of multi-channel signal into at least two subband sets, where each subband set includes at least one subband, and at least one subband set includes at least two subbands, obtain a subband IPD variance of each subband set, and if the subband IPD variance of each subband set is less than the second threshold, and the value of the parameter that is of the current frame and that represents left-right channel coherence is greater than the first threshold, determine that the IPD parameter extraction manner for the current frame of multi-channel signal is extracting subband set IPD parameters, and the extraction module 30 is further configured to calculate an IPD parameter of each of the at least two subband sets determined by the determining module 20.

In some feasible implementations, the second extraction manner is extracting subband IPD parameters, and the determining module 20 is further configured to if a subband IPD variance of at least one subband set is greater than the second threshold, or the left-right channel coherence value of the current frame is less than or equal to the first threshold, determine that the IPD parameter extraction manner for the current frame of multi-channel signal is extracting subband IPD parameters, and the extraction module 30 is further configured to calculate IPD parameters of all subbands of left- and right-channel frequency-domain signals of the current frame.

In some feasible implementations, the second extraction manner is extracting subband IPD parameters, and the determining module 20 is further configured to if a subband IPD variance of at least one subband set is greater than the second threshold, or the value of the parameter that is of the current frame and that represents left-right channel coherence is less than or equal to the first threshold, determine that the IPD parameter extraction manner for the current frame of multi-channel signal is extracting subband IPD parameters, and the extraction module 30 is further configured to calculate IPD parameters of all or some subbands of left- and right-channel frequency-domain signals of the current frame.

During specific implementation, the IPD parameter extraction apparatus may be further the encoder described in the embodiments of the present disclosure. The extraction apparatus may perform, using the modules built in the extraction apparatus, implementations described in the steps in the IPD parameter extraction manner. Details are not described herein again.

In this embodiment of the present disclosure, the encoder may preset a plurality of IPD parameter extraction manners such that when determining the IPD parameter extraction manner for the current frame of multi-channel signal, the encoder may determine the IPD parameter extraction manner for the current frame of multi-channel signal based on the obtained parameter used to determine the information extraction manner for the current frame of the multi-channel signal, thereby implementing adaptive selection among the IPD parameter extraction manners, and then the encoder may extract the IPD parameter of the current frame of multi-channel signal based on the determined IPD parameter extraction manner. In this embodiment of the present disclosure, choices of the IPD parameter extraction manner for the current frame of multi-channel signal are enriched, and the IPD parameter extraction manner for the current frame of multi-channel signal correlates with the parameter used to determine the information extraction manner for the current frame more closely. In this embodiment of the present disclosure, on the premise that a total quantity of bits used for multi-channel signal coding is unchanged, through adaptive selection among the IPD parameter extraction manners, when the group IPD parameter extraction manner is used, a quantity of bits occupied by IPD parameter coding can be reduced, and more bits can be used for coding of other parameters, thereby reducing a coding rate while maintaining coding quality, when extracting subband IPD parameters (including the subband set IPD parameter extraction manner and extracting subband IPD parameters) is used, a quantity of bits occupied by IPD parameter coding is greater than that when the group IPD parameter extraction manner is used, and an IPD parameter extraction manner can be adaptively selected to improve coding quality while maintaining a coding rate.

Figure 8:
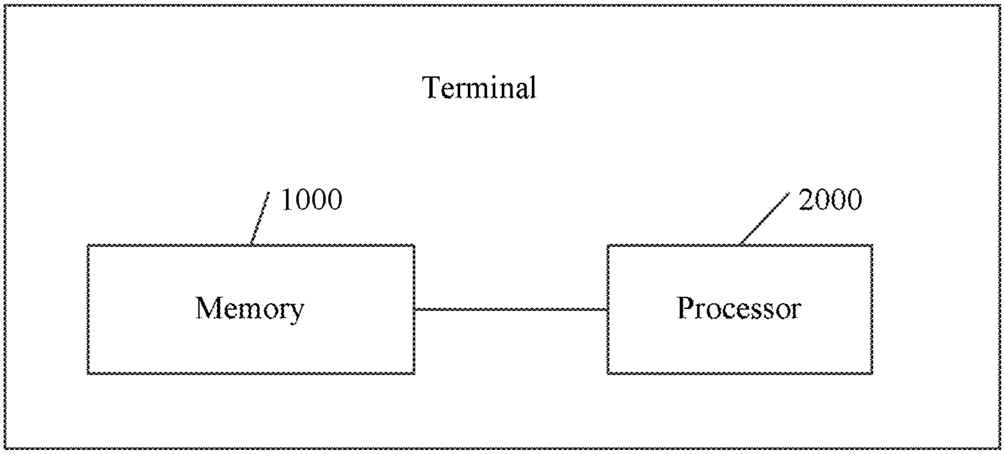
FIG. 8 is a schematic structural diagram of a terminal according to an embodiment of the present disclosure.

Referring to FIG. 8, FIG. 8 is a schematic structural diagram of a terminal according to an embodiment of the present disclosure. The terminal provided in this embodiment of the present disclosure includes a memory 1000 and a processor 2000. The memory 1000 is connected to the processor 2000.

The memory 1000 is configured to store a set of program code.

The processor 2000 is configured to call the program code stored in the memory 1000, to perform the following operations of obtaining a parameter used to determine an information extraction manner for a current frame of a multi-channel signal, determining an IPD parameter extraction manner for the current frame of multi-channel signal based on the parameter used to determine the information extraction manner for the current frame of the multi-channel signal, where the determined IPD parameter extraction manner for the current frame of multi-channel signal is one of at least two preset IPD parameter extraction manners, and extracting an IPD parameter of the current frame of multi-channel signal based on the determined IPD parameter extraction manner for the current frame of multi-channel signal.

In some feasible implementations, the parameter used to determine the information extraction manner for the current frame of the multi-channel signal includes at least one of a signal feature parameter of the current frame and a signal feature parameter of each of A frames previous to the current frame, where A is an integer not less than 1, the signal feature parameter of the current frame includes at least one of a left-right channel coherence value of the current frame, a parameter that is of the current frame and that represents a left-right channel coherence, a subband IPD variance of the current frame, and an ITD of the current frame, the signal feature parameter of each of the A frames previous to the current frame includes at least one of a left-right channel coherence value of each of the A frames previous to the current frame, a parameter that is of each of the A frames previous to the current frame and that represents a left-right channel coherence, a subband IPD variance of each of the A frames previous to the current frame, an ITD of each of the A frames previous to the current frame, an IPD parameter extraction manner for each of the A frames previous to the current frame, and a signal class of each of the A frames previous to the current frame, and the signal class includes speech frame or music frame.

In some feasible implementations, the parameter used to determine the information extraction manner for the current frame of the multi-channel signal includes the left-right channel coherence value of the current frame and the subband IPD variance of the current frame, and if the left-right channel coherence value of the current frame is greater than a first threshold, and the subband IPD variance of the current frame is less than a second threshold, the processor 2000 is further configured to determine that the IPD parameter extraction manner for the current frame of multi-channel signal is a first extraction manner.

In some feasible implementations, the parameter used to determine the information extraction manner for the current frame of the multi-channel signal includes the parameter that is of the current frame and that represents left-right channel coherence and the subband IPD variance of the current frame, and if a value of the parameter that is of the current frame and that represents left-right channel coherence is greater than a first threshold, and the subband IPD variance of the current frame is less than a second threshold, the processor 2000 is further configured to determine that the IPD parameter extraction manner for the current frame of multi-channel signal is a first extraction manner.

In some feasible implementations, the parameter used to determine the information extraction manner for the current frame of the multi-channel signal includes the IPD parameter extraction manner for each of the A frames previous to the current frame and the signal class of each of the A frames previous to the current frame, and if the IPD parameter extraction manner for each of the A frames previous to the current frame is a first extraction manner, and the signal class of each of the A frames previous to the current frame is music frame, the processor 2000 is further configured to determine that the IPD parameter extraction manner for the current frame of multi-channel signal is the first extraction manner.

In some feasible implementations, the parameter used to determine the information extraction manner for the current frame of the multi-channel signal includes the ITD of the current frame, the subband IPD variance of the current frame, and the signal class of each of the A frames previous to the current frame, and if a value of the ITD of the current frame is greater than a third threshold, the subband IPD variance of the current frame is less than a fourth threshold, and the signal class of each of the A frames previous to the current frame is speech frame, the processor 2000 is further configured to determine that the IPD parameter extraction manner for the current frame of multi-channel signal is a first extraction manner.

In some feasible implementations, the first extraction manner includes extracting a group IPD parameter of the current frame of multi-channel signal, or extracting no IPD parameter of the current frame of multi-channel signal.

In some feasible implementations, when the first extraction manner is extracting a group IPD parameter of the current frame of multi-channel signal, the processor 2000 is further configured to extract subband IPD parameters of left- and right-channel frequency-domain signals of the current frame, and determine a group IPD of the current frame of multi-channel signal based on the extracted subband IPD parameters.

In some feasible implementations, if the IPD parameter extraction manner for the current frame of multi-channel signal is not the first extraction manner, the processor 2000 is further configured to determine that the IPD parameter extraction manner for the current frame of multi-channel signal is a second extraction manner, where the second extraction manner includes extracting subband set IPD parameters or extracting subband IPD parameters.

In some feasible implementations, the second extraction manner is extracting subband set IPD parameters, and the processor 2000 is further configured to classify subbands of left- and right-channel frequency-domain signals of the current frame of multi-channel signal into at least two subband sets, where each subband set includes at least one subband, and at least one subband set includes at least two subbands, obtain a subband IPD variance of each subband set, if the subband IPD variance of each subband set is less than the second threshold, and the left-right channel coherence value of the current frame is greater than the first threshold, determine that the IPD parameter extraction manner for the current frame of multi-channel signal is extracting subband set IPD parameters, and calculate an IPD parameter of each of the at least two subband sets.

In some feasible implementations, the second extraction manner is extracting subband set IPD parameters, and the processor 2000 is further configured to classify subbands of left- and right-channel frequency-domain signals of the current frame of multi-channel signal into at least two subband sets, where each subband set includes at least one subband, and at least one subband set includes at least two subbands, obtain a subband IPD variance of each subband set, if the subband IPD variance of each subband set is less than the second threshold, and the value of the parameter that is of the current frame and that represents left-right channel coherence is greater than the first threshold, determine that the IPD parameter extraction manner for the current frame of multi-channel signal is extracting subband set IPD parameters, and calculate an IPD parameter of each of the at least two subband sets.

In some feasible implementations, the second extraction manner is extracting subband IPD parameters, and the processor 2000 is further configured to, if a subband IPD variance of at least one subband set is greater than the second threshold, or the left-right channel coherence value of the current frame is less than or equal to the first threshold, determine that the IPD parameter extraction manner for the current frame of multi-channel signal is extracting subband IPD parameters, and calculate IPD parameters of all or some subbands of left- and right-channel frequency-domain signals of the current frame.

In some feasible implementations, the second extraction manner is extracting subband IPD parameters, and the processor 2000 is further configured to, if a subband IPD variance of at least one subband set is greater than the second threshold, or the value of the parameter that is of the current frame and that represents left-right channel coherence is less than or equal to the first threshold, determine that the IPD parameter extraction manner for the current frame of multi-channel signal is extracting subband IPD parameters, and calculate IPD parameters of all or some subbands of left- and right-channel frequency-domain signals of the current frame.

In some feasible implementations, when the parameter used to determine the information extraction manner for the current frame of the multi-channel signal includes the left—right channel coherence value of the current frame, the processor 2000 is further configured to obtain left- and right-channel time-domain signals of the current frame of the multi-channel signal, and convert the left- and right-channel time-domain signals into left- and right-channel frequency-domain signals, and calculate the left-right channel coherence value of the current frame based on the left- and right-channel frequency-domain signals.

In some feasible implementations, when the parameter used to determine the information extraction manner for the current frame of the multi-channel signal includes the subband IPD variance of the current frame, the processor 2000 is further configured to obtain left- and right-channel time-domain signals of the current frame of the multi-channel signal, and convert the left- and right-channel time-domain signals into left- and right-channel frequency-domain signals, and divide the left- and right-channel frequency-domain signals into at least two subbands, calculate an IPD of each subband based on a frequency-domain signal of each subband, and calculate the subband IPD variance of the current frame based on the IPD of each subband.

In this application, a plurality of IPD parameter extraction manners may be preset such that in determining the IPD parameter extraction manner for the current frame of multi-channel signal, the IPD parameter extraction manner for the current frame of multi-channel signal may be determined based on the obtained parameter used to determine the information extraction manner for the current frame of the multi-channel signal, thereby implementing adaptive selection among the IPD parameter extraction manners, and then the IPD parameter of the current frame of multi-channel signal may be extracted based on the determined IPD parameter extraction manner. In this application, choices of the IPD parameter extraction manner for the current frame of multi-channel signal are enriched, and the IPD parameter extraction manner for the current frame of multi-channel signal correlates with the parameter used to determine the information extraction manner for the current frame more closely. In this application, when the IPD parameter extraction manner for the current frame of multi-channel signal is extracting a group IPD, IPD parameter coding occupies a relatively small quantity of bits, and more bits can be used for coding of other parameters, thereby improving audio coding quality. In this application, a plurality of IPD parameters may be used as the IPD parameter of the current frame of multi-channel signal such that phase information can be better maintained, and audio coding accuracy can be improved. In addition, a quantity of IPD parameters extracted after subbands are classified into subband sets is less than that of IPD parameters extracted for all subbands, and more bits can be used for coding of other parameters, thereby improving audio coding quality.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments may be performed. The storage medium may include a magnetic disk, an optical disc, a read-only memory (ROM), a random access memory (RAM), or the like.

In the specification, claims, and accompanying drawings of the present disclosure, the terms "first," "second," "third," "fourth," and the like are intended to distinguish between different objects but do not indicate a specific order. In addition, the terms "contain," "include," or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

What are disclosed above are merely examples of embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. A method comprising:

obtaining at least one of a current parameter of a current frame of an audio signal or a previous parameter of a previous frame of the audio signal, wherein the audio signal comprises at least two channels, wherein the current parameter comprises at least one of a first parameter representing a left-right channel coherence of the current frame, a first subband inter-channel phase difference (IPD) variance of the current frame, a first signal class of the current frame, or an inter-channel time difference (ITD) of the current frame, wherein the previous parameter comprises at least one of a second parameter representing a left-right channel coherence of the previous frame, a second subband IPD variance of the previous frame, an ITD parameter of the previous frame, an IPD parameter extraction manner for the previous frame, or a second signal class of the previous frame, wherein the second signal class is either speech or music and the first signal class is either the speech or the music;

obtaining an IPD parameter extraction manner for the current frame based on the at least one of the current parameter or the previous parameter, wherein the IPD parameter extraction manner for the current frame is a first IPD parameter extraction manner or a second IPD parameter extraction manner, wherein the first IPD parameter extraction manner comprises one of a first manner for extracting a group IPD parameter of the current frame, a second manner for not extracting an IPD parameter of the current frame, or a third manner for setting the IPD parameter of the current frame to zero, and wherein the second IPD parameter extraction manner comprises one of a fourth manner for extracting subband set IPD parameters or a fifth manner for extracting subband IPD parameters;

extracting the IPD parameter of the current frame based on the IPD parameter extraction manner; and encoding the IPD parameter of the current frame, wherein obtaining the IPD parameter extraction manner for the current frame comprises obtaining, when a value of the first parameter is greater than a first threshold, the first IPD parameter extraction manner as the IPD parameter extraction manner for the current frame, and wherein the first threshold is 0.75.

2. The method of claim 1, wherein the first IPD parameter extraction manner is the first manner, and wherein extracting the IPD parameter of the current frame comprises extracting subband IPD parameters of a left-channel signal and a right-channel signal of the current frame.

3. The method of claim 1, wherein the second IPD parameter extraction manner is the fourth manner, and wherein extracting the IPD parameter of the current frame comprises classifying subbands of a left-channel signal of the current frame and a right-channel signal of the current frame into at least two subband sets.

4. The method of claim 1, wherein obtaining the IPD parameter extraction manner for the current frame comprises obtaining, when the IPD parameter extraction manner for the previous frame is the first IPD parameter extraction manner and the second signal class is the music, the first IPD parameter extraction manner as the IPD parameter extraction manner for the current frame.

5. The method of claim 1, wherein obtaining the IPD parameter extraction manner for the current frame comprises obtaining, when a value of the ITD of the current frame is greater than a first threshold, the first subband IPD variance is less than a second threshold, and the second signal class is the speech, the first IPD parameter extraction manner as the IPD parameter extraction manner for the current frame.

6. The method of claim 1, wherein the first IPD parameter extraction manner is the first manner, and wherein extracting the IPD parameter of the current frame comprises:

extracting subband IPD parameters of a left-channel signal and a right-channel signal of the current frame; and obtaining the group IPD parameter of the current frame based on the subband IPD parameters.

7. The method of claim 1, wherein the second IPD parameter extraction manner is the fifth manner, and wherein extracting the IPD parameter of the current frame comprises calculating IPD parameters of at least some subbands of a left-channel signal of the current frame and a right-channel signal of the current frame.

8. The method of claim 1, wherein the second IPD parameter extraction manner is the fourth manner, and wherein extracting the IPD parameter of the current frame comprises:

classifying subbands of a left-channel signal of the current frame and a right-channel signal of the current frame into at least two subband sets, wherein each subband set of the at least two subband sets comprises at least one subband, and wherein at least one subband set of the at least two subband sets comprises at least two subbands; and calculating an IPD parameter of each subband set of the at least two subband sets.

9. An apparatus, comprising:

a memory configured to store instructions; and a processor coupled to the memory and configured to execute the instructions to cause the apparatus to be configured to:

obtain at least one of a current parameter of a current frame of an audio signal or a previous parameter of a previous frame of the audio signal, wherein the audio signal comprises at least two channels, wherein the current parameter comprises at least one of a first parameter representing a left-right channel coherence of the current frame, a first subband inter-channel phase difference (IPD) variance of the current frame, a first signal class of the current frame, or an inter-channel time difference (ITD) of the current frame, wherein the previous parameter comprises at least one of a second parameter representing a left-right channel coherence of the previous frame, a second subband IPD variance of the previous frame, an ITD parameter of the previous frame, an IPD parameter extraction manner for the previous frame, or a second signal class of the previous frame, and wherein the second signal class is either speech or music and the first signal class is either the speech or the music;

obtain an IPD parameter extraction manner for the current frame based on the at least one of the current parameter or the previous parameter, wherein the IPD parameter extraction manner for the current frame is a first IPD parameter extraction manner or a second IPD parameter extraction manner, wherein the first IPD parameter extraction manner comprises one of a first manner for extracting a group IPD parameter of the current frame, a second manner for not extracting an IPD parameter of the current frame, or a third manner for setting the IPD parameter of the current frame to zero, and wherein the second IPD parameter extraction manner comprises one of a fourth manner for extracting subband set IPD parameters or a fifth manner for extracting subband IPD parameters;

extract the IPD parameter of the current frame based on the IPD parameter extraction manner; and encode the IPD parameter of the current frame;

wherein when executed by the processor, the instructions cause the apparatus to obtain, when a value of the first parameter is greater than a first threshold, the first IPD parameter extraction manner as the IPD parameter extraction manner for the current frame;

wherein the first threshold is 0.75.

10. The apparatus of claim 9, wherein the first IPD parameter extraction manner is the first manner, and wherein when executed by the processor, the instructions cause the apparatus to extract the IPD parameter of the current frame at least in part by extracting subband IPD parameters of a left-channel signal and a right-channel signal of the current frame.

11. The apparatus of claim 10, wherein the second IPD parameter extraction manner is the fourth manner, and wherein when executed by the processor, the instructions cause the apparatus to extract the IPD parameter of the current frame at least in part by classifying subbands of a left-channel signal of the current frame and a right-channel signal of the current frame into at least two subband sets.

12. The apparatus of claim 9, wherein when executed by the processor, the instructions cause the apparatus to obtain, when the IPD parameter extraction manner for the previous frame is the first IPD parameter extraction manner and the second signal class is the music, the first IPD parameter extraction manner as the IPD parameter extraction manner for the current frame.

13. The apparatus of claim 9, wherein when executed by the processor, the instructions cause the apparatus to obtain, when a value of the ITD of the current frame is greater than a first threshold, the first subband IPD variance is less than a second threshold, and the second signal class is the speech, the first IPD parameter extraction manner as the IPD parameter extraction manner for the current frame.

14. The apparatus of claim 9, wherein the first IPD parameter extraction manner is the first manner, and wherein when executed by the processor, the instructions further cause the apparatus to be configured to:

extract subband IPD parameters of a left-channel signal of the current frame and a right-channel signal of the current frame; and obtain the group IPD parameter of the current frame based on the subband IPD parameters.

15. The apparatus of claim 9, wherein the second IPD parameter extraction manner is the fifth manner, and wherein when executed by the processor, the instructions cause the apparatus to be configured to calculate IPD parameters of at least some subbands of a left-channel signal and a right-channel signal of the current frame.

16. The apparatus of claim 9, wherein the second IPD parameter extraction manner is the fourth manner, and wherein when executed by the processor, the instructions cause the apparatus to be configured to:

classify subbands of a left-channel signal of the current frame and a right-channel signal of the current frame into at least two subband sets, wherein each subband set of the at least two subband sets comprises at least one subband, and wherein at least one subband set of the at least two subband sets comprises at least two subbands; and calculate an IPD parameter of each subband set of the at least two subband sets.

17. A non-transitory computer program product comprising instructions that are stored on a computer-readable medium and that, when executed by a processor, cause an apparatus to:

obtain at least one of a current parameter of a current frame of an audio signal or a previous parameter of a previous frame of the audio signal, wherein the audio signal comprises at least two channels, wherein the current parameter comprises at least one of a first parameter representing a left-right channel coherence of the current frame, a first subband inter-channel phase difference (IPD) variance of the current frame, a first signal class of the current frame, or an inter-channel time difference (ITD) of the current frame, wherein the previous parameter comprises at least one of a second parameter representing a left-right channel coherence of the previous frame, a second subband IPD variance of the previous frame, an ITD parameter of the previous frame, an IPD parameter extraction manner for the previous frame, or a second signal class of the previous frame, and wherein the second signal class is either speech or music and the first signal class is either the speech or the music;

obtain an IPD parameter extraction manner for the current frame based on the at least one of the current parameter or the previous parameter, where the IPD parameter extraction manner for the current frame is a first IPD parameter extraction manner or a second IPD parameter extraction manner, wherein the first IPD parameter extraction manner comprises one of a first manner for extracting a group IPD parameter of the current frame, a second manner for not extracting an IPD parameter of the current frame, or a third manner for setting the IPD parameter of the current frame to zero, and wherein the second IPD parameter extraction manner comprises one of a fourth manner for extracting subband set IPD parameters or a fifth manner for extracting subband IPD parameters;

extract the IPD parameter of the current frame based on the obtained IPD parameter extraction manner; and encode the IPD parameter of the current frame;

wherein when executed by the processor, the instructions cause the apparatus to obtain, when a value of the first parameter is greater than a first threshold, the first IPD parameter extraction manner as the IPD parameter extraction manner for the current frame;

wherein the first threshold is 0.75.

18. The computer program product of claim 17, wherein the first IPD parameter extraction manner is the first manner, and wherein when executed by the processor, the instructions cause the apparatus to extract the IPD parameter of the current frame at least in part by extracting subband IPD parameters of a left-channel signal and a right-channel signal of the current frame.

19. The computer program product of claim 17, wherein when executed by the processor, the instructions cause the apparatus to obtain, when the IPD parameter extraction manner for the previous frame is the first IPD parameter extraction manner and the second signal class is the music, the first IPD parameter extraction manner as the IPD parameter extraction manner for the current frame.

20. The computer program product of claim 17, wherein when executed by the processor, the instructions cause the apparatus to obtain, when a value of the ITD of the current frame is greater than a first threshold, the first subband IPD variance is less than a second threshold, and the second signal class is the speech, the first IPD parameter extraction manner as the IPD parameter extraction manner for the current frame.

* * * * *